June 4, 1935.                    D. A. CHRISTIAN                    2,003,782
                          ELECTRIC SWITCHING MECHANISM
                        Filed March 31, 1933     15 Sheets-Sheet 4

INVENTOR
DAVID A CHRISTIAN
ATTY.

June 4, 1935.　　D. A. CHRISTIAN　　2,003,782
ELECTRIC SWITCHING MECHANISM
Filed March 31, 1933　　15 Sheets-Sheet 6

INVENTOR
DAVID A CHRISTIAN
Wm Walter Owen
ATTY.

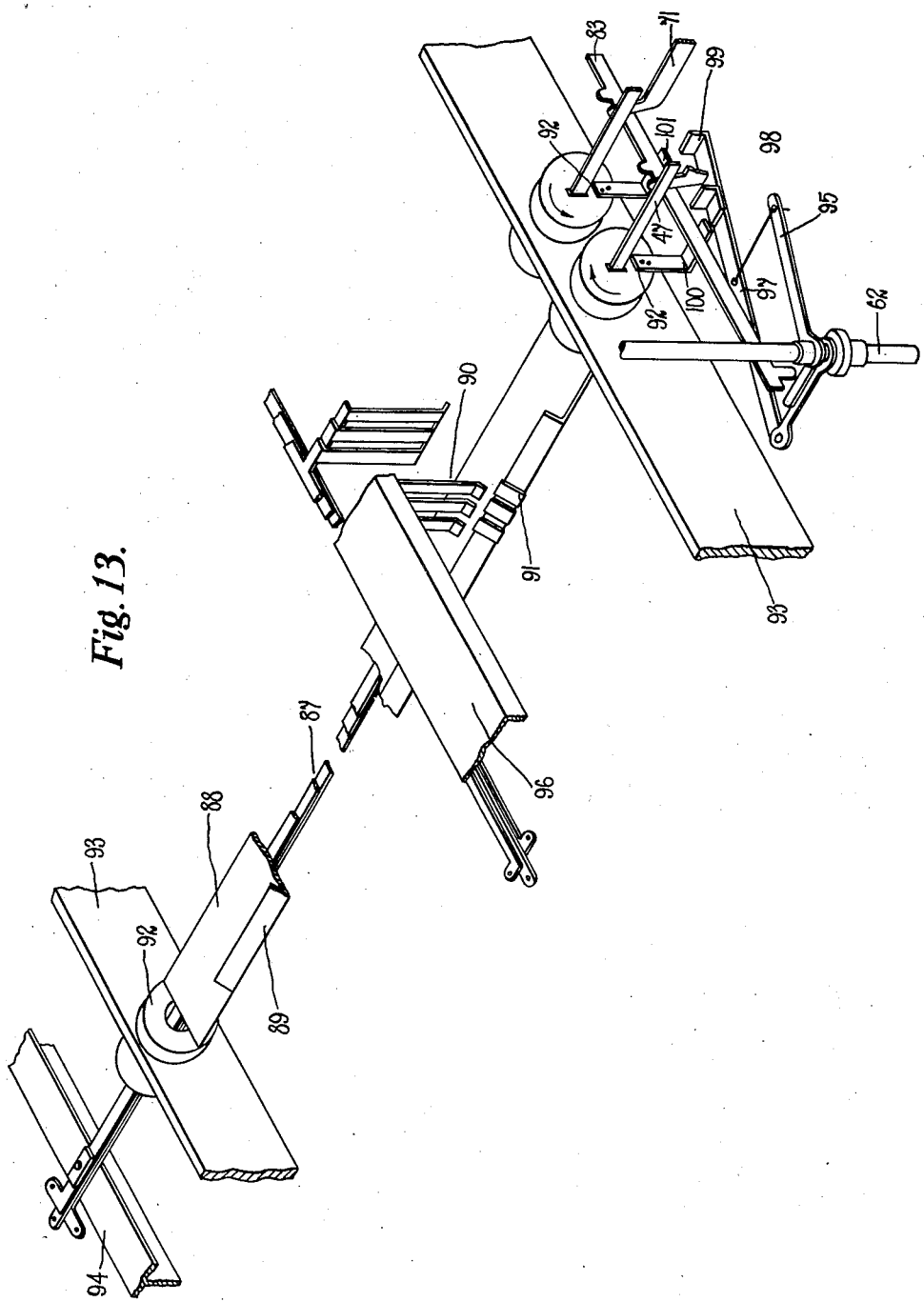

June 4, 1935.  D. A. CHRISTIAN  2,003,782
ELECTRIC SWITCHING MECHANISM
Filed March 31, 1933   15 Sheets-Sheet 10

INVENTOR
DAVID A CHRISTIAN
ATTY.

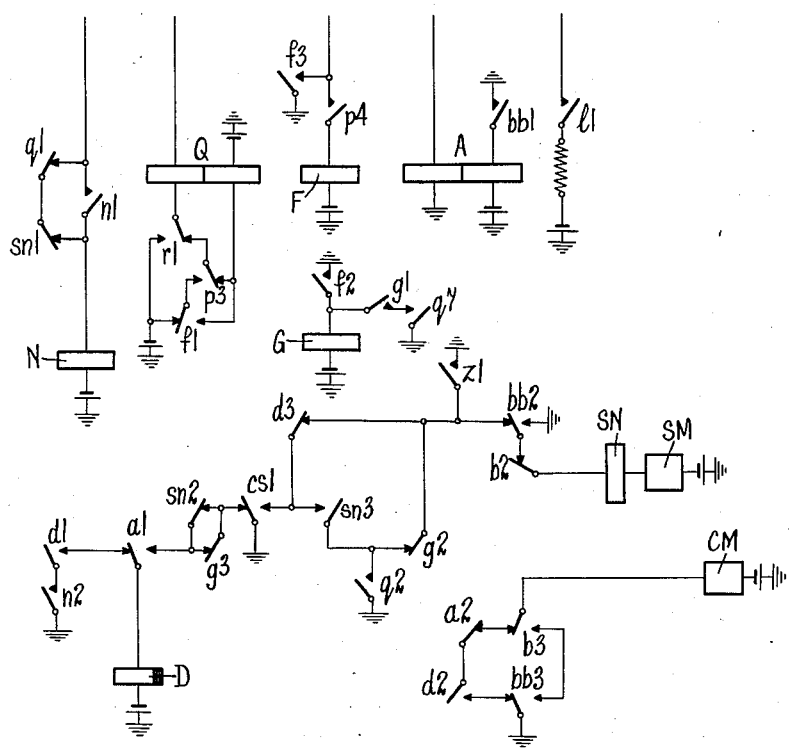
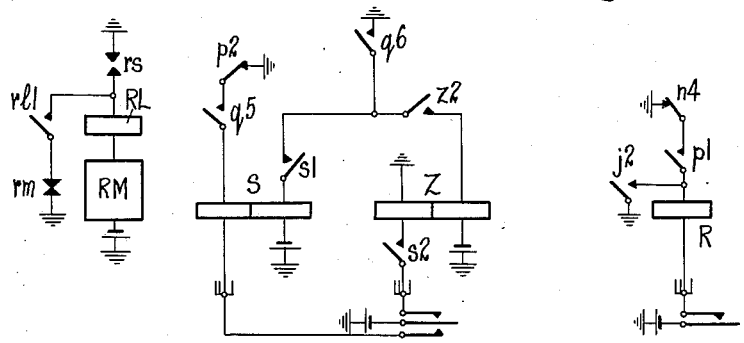
Fig. 16a.

Patented June 4, 1935

2,003,782

UNITED STATES PATENT OFFICE 2,003,782

ELECTRIC SWITCHING MECHANISM

David Adam Christian, London, England, assignor to Siemens Brothers & Company Limited, London, England Application March 31, 1933, Serial No. 663,692
In Great Britain March 31, 1932

11 Claims. (Cl. 179—18)

This invention relates to electric switches having a number of outlets to any one of which connection may be made over the switch. Switches of this character find their greatest use in selectively operated systems such as automatic telephone systems.

In general to give connection to a particular outlet a switch or some part thereof has to execute a movement, the extent of which may depend on the outlet concerned such being the case in for example the two motion selector as used in automatic telephone systems or again a number of connecting parts one to each outlet may be provided, and the complete entity regarded as a switch, one of these parts being selected and operated to connect to an outlet.

When a number of the former type of switches have access to the same group of outlets which accordingly are multiplied over the switches, it is feasible to use common apparatus to steer a switch to a required outlet say by giving a selected outlet a particular electrical potential and setting the switch in motion and arresting it at the outlet by reason of a circuit change brought about by the potential. The common apparatus is called in aid by any switch and is released after use to serve for any other switch that requires it. In the case of the latter type of switch the common apparatus may close a circuit for operating a particular connecting part.

The present invention has in view, amongst other things, a switch construction readily usable with common control apparatus.

One aspect of the invention is that the outlet to which the switch is to make connection is marked or distinguished from the other outlets not by giving the outlet a particular electrical potential but by putting it in a position to exercise a mechanical force or control in respect of the connecting parts of the switch.

This distinguishing of the outlet is individual to the outlet in the sense that it could be carried out if all the switch connecting parts were removed, so that the mechanism for distinguishing an outlet may take effect on a number of switches.

This distinguishing of an outlet since it may be applied at a number of switch positions simultaneously entails some operation at a particular switch, so that only one switch is affected.

This operation in its simplest form is a movement or positioning of contact carrying parts which makes them subject to the force or control referred to.

One conception in which the invention is embodied may be referred to.

The outlets are in the form of bare wires spaced apart and supported at intervals and disposed in columns of horizontal wires arranged one behind the other.

A plate which may be of metal is disposed transversely to the rectangular bunch or multiple of wires the several columns of wire passing through apertures in the plate. The plate carries a number of contacting members of a springy nature in each aperture one contacting member for each wire passing through the aperture.

Normally a contacting member would be above the corresponding wire and if the plate is lowered would pass by the wire.

Associated with each wire however is a guide bar provided with a projecting part. The guide bar is movable so that the projection can be brought into a position to guide the flexible contacting member outwards when the plate is dropped so as to pass over the wire and make contact with the wire. The guide bar would like an outlet wire continue over a number of switch positions and need only be moved into its effective position while a plate is being dropped.

The metal plate is connected to the inlet wire of the switch. When the switch is used in an automatic telephone system more than one conductor may have to be switched and accordingly the plate becomes a supporting member which is provided with several sets of contacting members each set being insulated from the others and the plate. One guide bar by means of suitably disposed projections could control one contact member of each so that simultaneous contact is made with the requisite number of outlet wires.

Common mechanism may be provided for lifting the plates after use into their normal positions.

The above conception contemplates that the contacting members engage the sides of the wires. It is feasible to arrange the contacting members so as to project into horizontal apertures in the plate. In this case the outlet 'wires' may be in the form of flat pierced strips of ladder like form the treads of which are normally cleared when a plate is dropped. The guides here force contacting members so as to pass behind and contact with treads. The contacting members need to be shaped or slotted so that when a plate is dropped movement of other guides is not prevented.

The control of the movement of the several guides may be exercised in any convenient manner. For the selection of a particular one a cross bar arrangement may be employed the intersection of two bars determining a particular one which is then mechanically moved.

It is also within the scope of the present invention to make the outlet move and act as its own marker.

The switch when operated e. g. when the plate has dropped may cause disconnection of electrical parts controlling the marking.

The switch may be used also in various ways. It is possible to make it connect to two outlets at the same time in which case two guide members need to be operated or again it may serve merely to cross-connect two or more such 'outlet' there being no 'inlet' to the switch or again more than one switch may be operated at a time.

It will be noted that a feature of the switch is that to connect to an outlet or outlets the whole of the contacting members are given a small movement but one or a specified number only are made effective consequent on mechanical operation on the multiple which mechanical operation need only be of temporary duration.

Varying means may be employed to control the operation of the switch. For instance the switch when taken into use may make a preliminary movement to close contacts to call in the control apparatus and a further movement when the multiple of outlets has been marked. The latter movement may also cause disconnection of the electrical parts controlling the marking. Electromagnetic control may play a part in the switch movement, controlling the preliminary movement and the later movement. The same magnet may by being de-energized when the switch is no longer required, place the switch in a position to be restored to normal.

For the clearer understanding of the invention reference will now be had to the accompanying drawings but it should be distinctly understood that these are shown by way of example only and considerable modifications of construction and circuit details are possible without departing from the spirit of the invention.

One embodiment of the invention is shown by way of example in Figs. 1 to 12 and a modification is shown in Fig. 13.

Figs. 14 to 18 each of which has been divided into two parts A and B show circuit diagrams suitable for controlling the mechanisms illustrated.

More particularly Fig. 1 shows a front view of a switch assembly with common controlling mechanism on the right of the switches. Ten switches are shown the ends of the switches appearing in the figure, the switches being inserted and withdrawn from the assembly in a direction at right angles to the plane of the paper. Extending partly across the assembly is a sectional view showing in partly superimposed sections from left to right a set of multiple conductors for an outlet choice, a guide rod associated with that multiple, a supporting bar for the guide rods, and multiple conductors, a guide rod and a set of multiple conductors associated with that guide rod, the guide rods and test conductor of the multiple extending into the common apparatus part. One transverse rod on which the supporting bar carrying the guide rods and multiple is carried is also shown in section and above the superimposed section is a sectional view taken through part of a switch member on the line AA in Fig. 3. Also at the bottom of the right hand switch member is a section of a part of the switch mechanism taken along the line CC.

Fig. 2 shows an end view looking at the right hand end of Fig. 1, and shows the common controlling mechanism. Parts have been cut away to show more clearly a shift rod for the seventh row of outlets from the bottom.

Fig. 3 shows a face view of a switch member as would be seen by looking at the right hand end of Fig. 1 with the common mechanism removed. All the contacting members have not been shown but only those for two rows of outlets, viz. the sixth and seventh from the bottom. Part of the member has been cut away at the fifth row to show the method of supporting the guide rods and multiple.

Fig. 13 shows a perspective view of a modification in which there are no guide rods running transversely to the switch assembly but in which the multiple itself is partially rotated to effect connection with a switch member. Only parts essential to the understanding of the modification are shown and part of the multiple for one outlet only and the corresponding contact member of a switch only are shown. The supporting and operating means are shown only as regards the row of outlets in which the multiple is one it being clear from a consideration of the essential parts shown in conjunction with Figs. 1 to 12 how the several parts would be assembled.

Figure 14A:
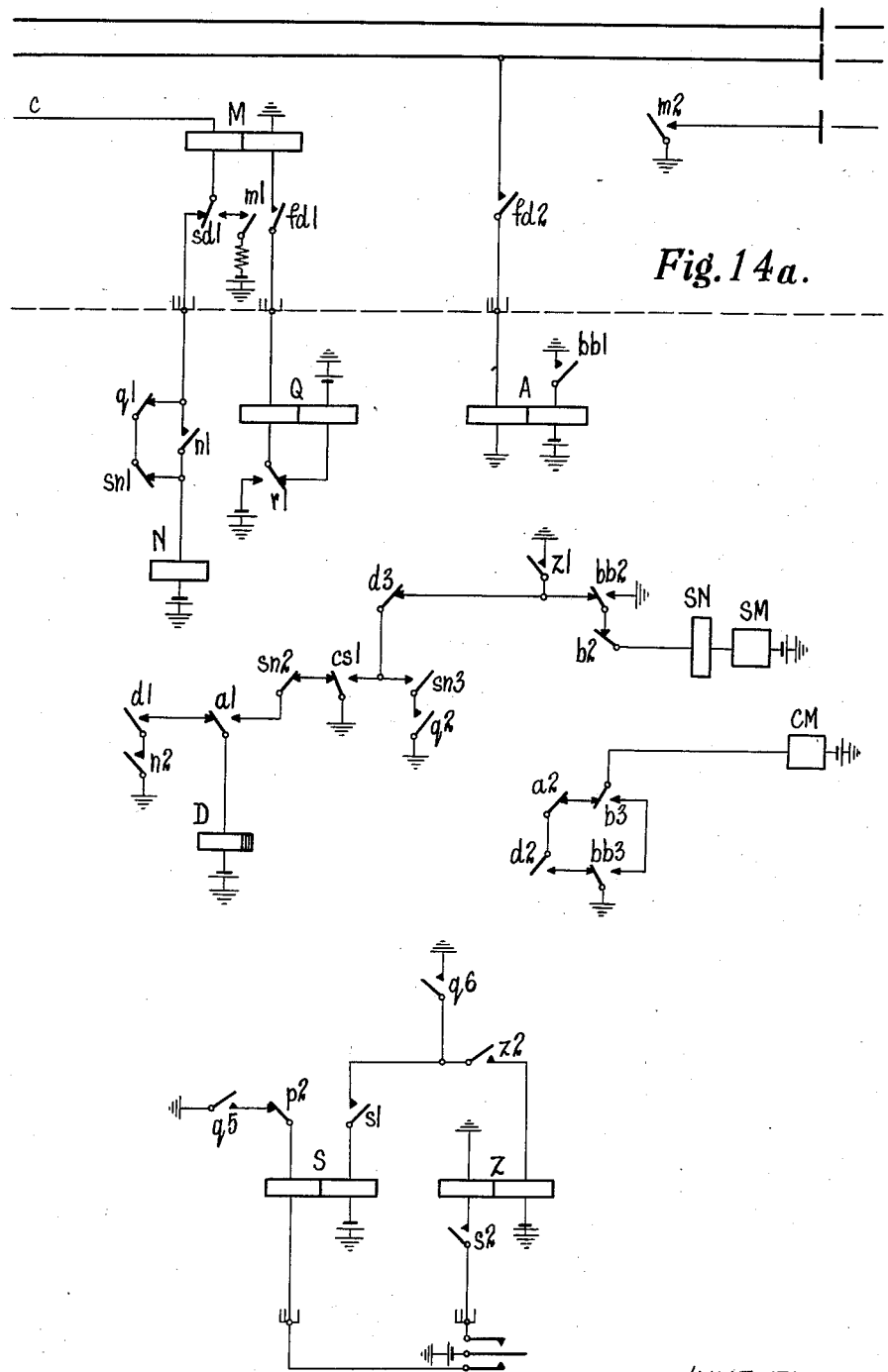
Figure 14B:
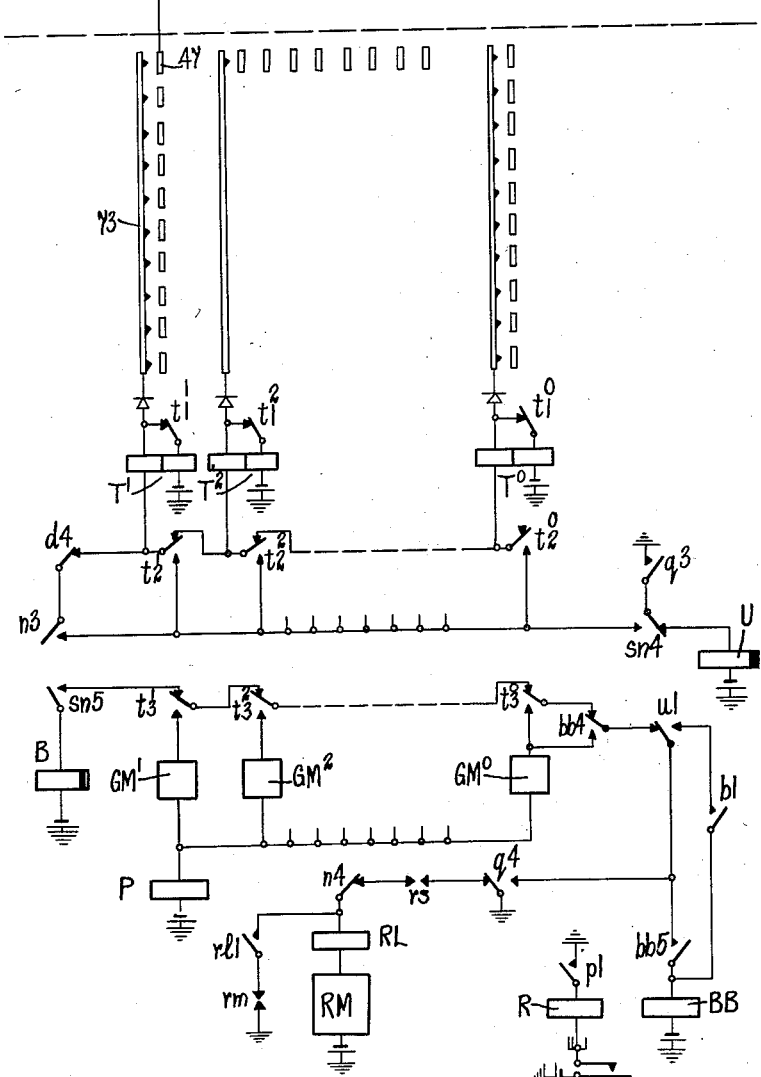
Figure 15A:
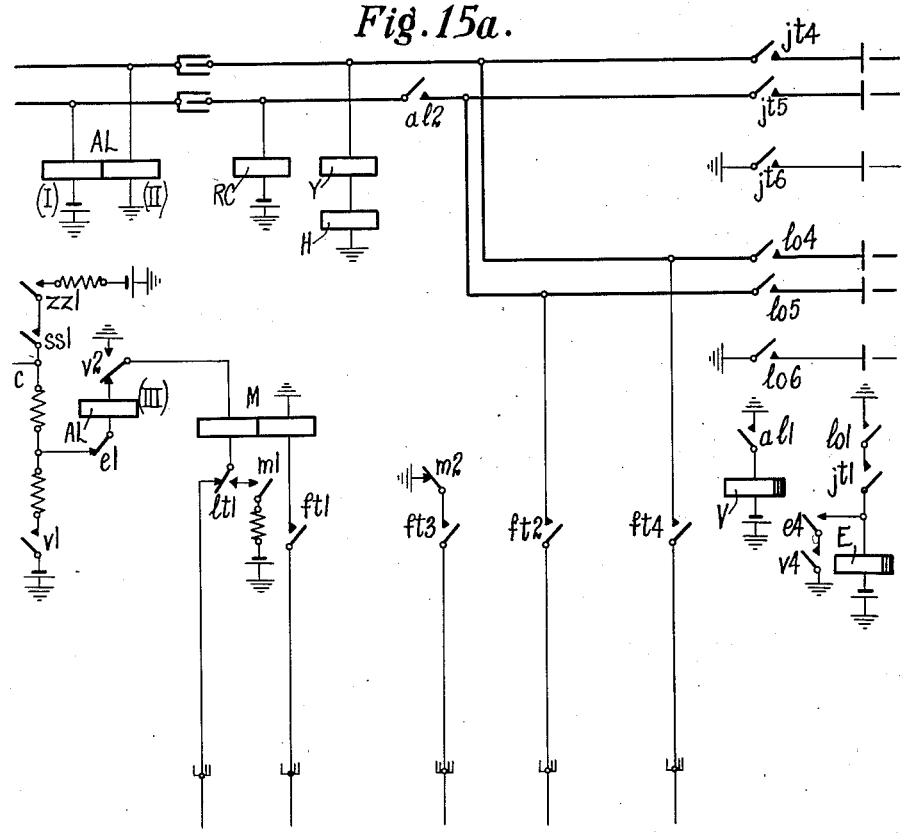
Figure 17A:
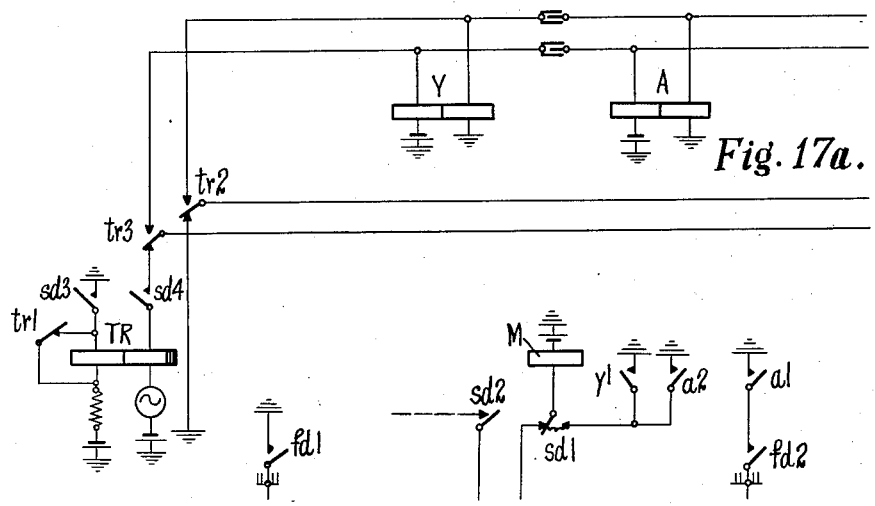
Figure 15B:
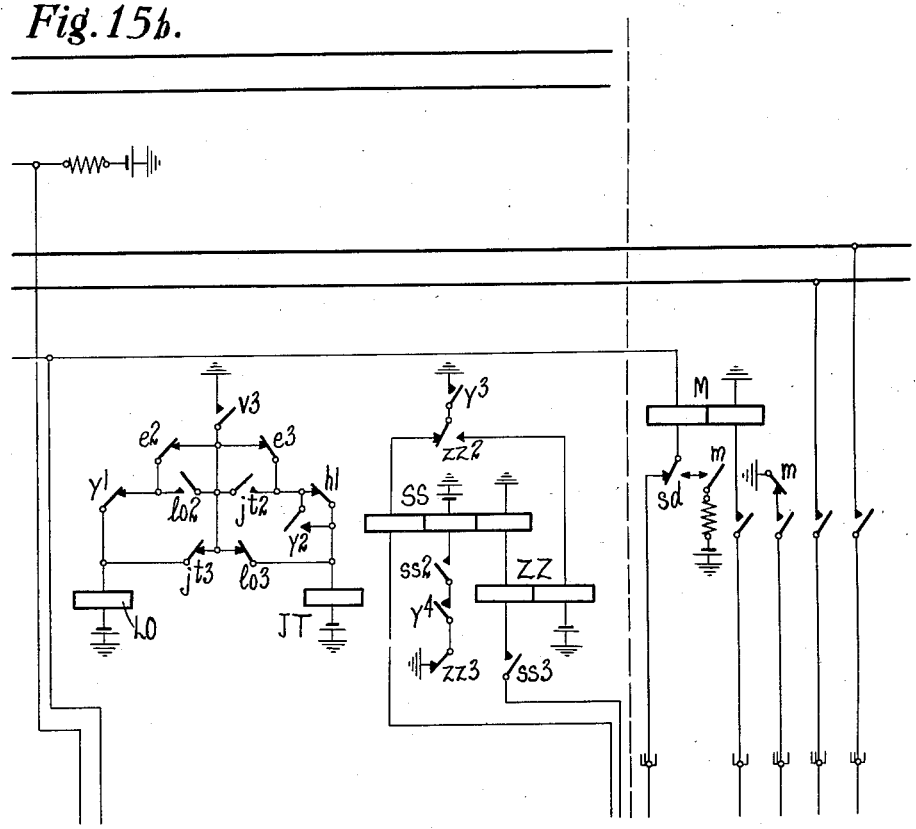
Figure 17B:
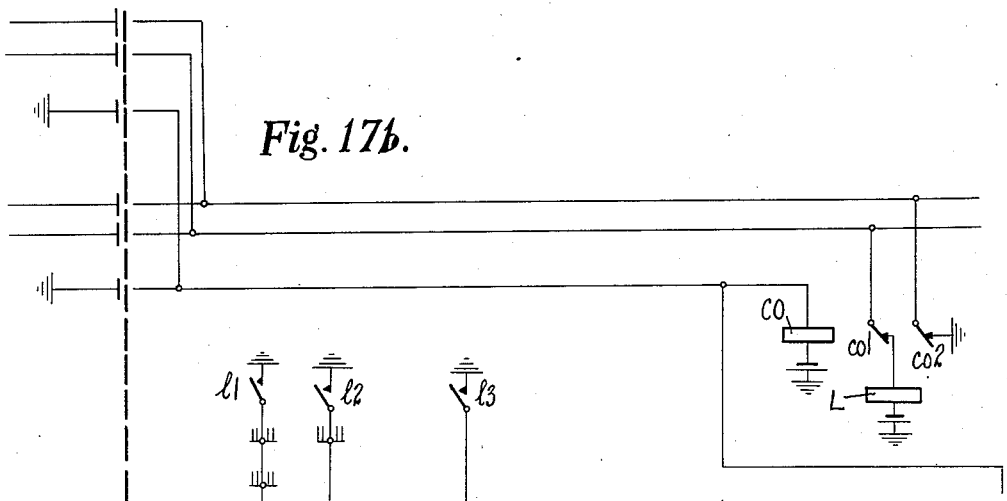
Figure 16B:
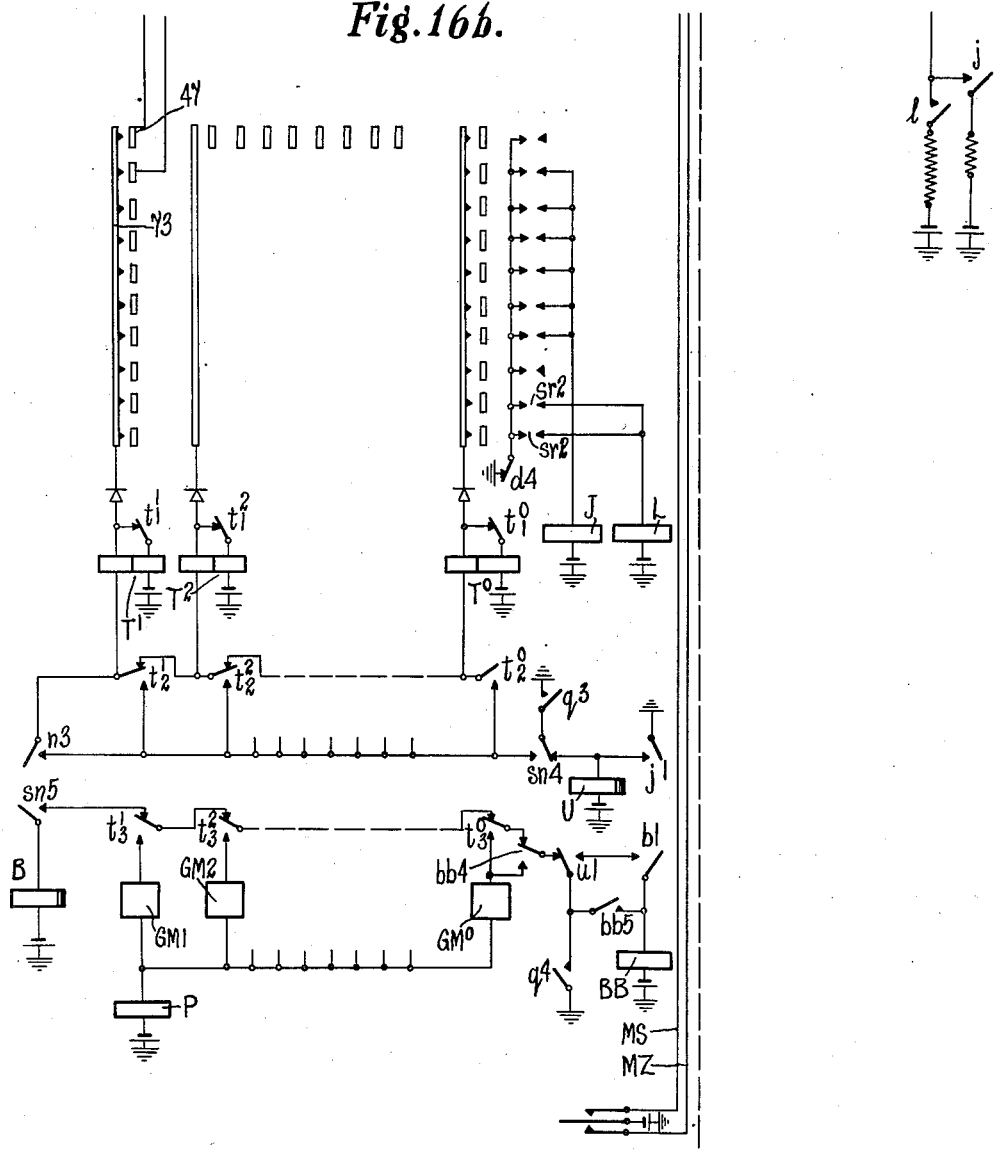
Figure 18A:
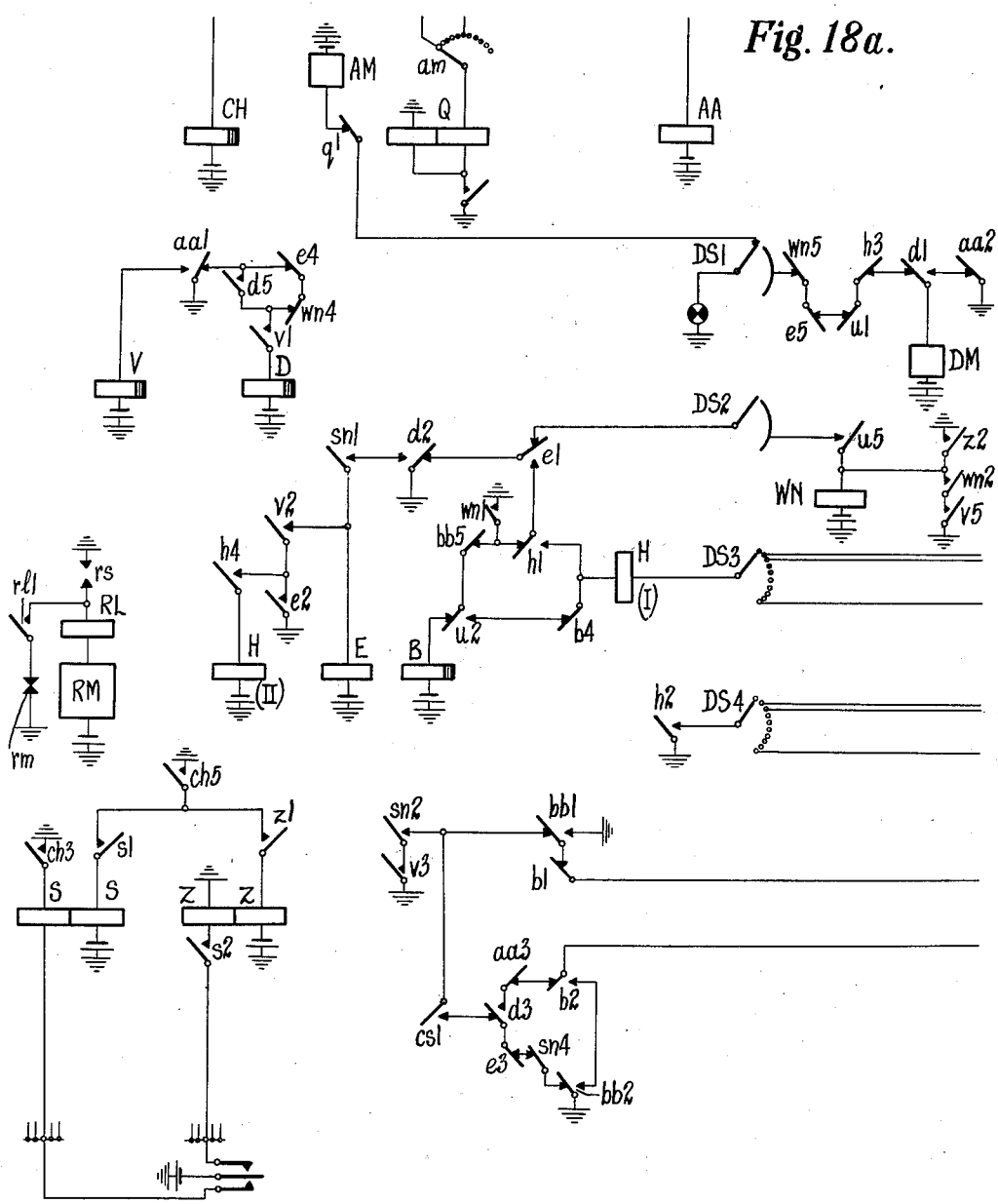
Figure 18B:
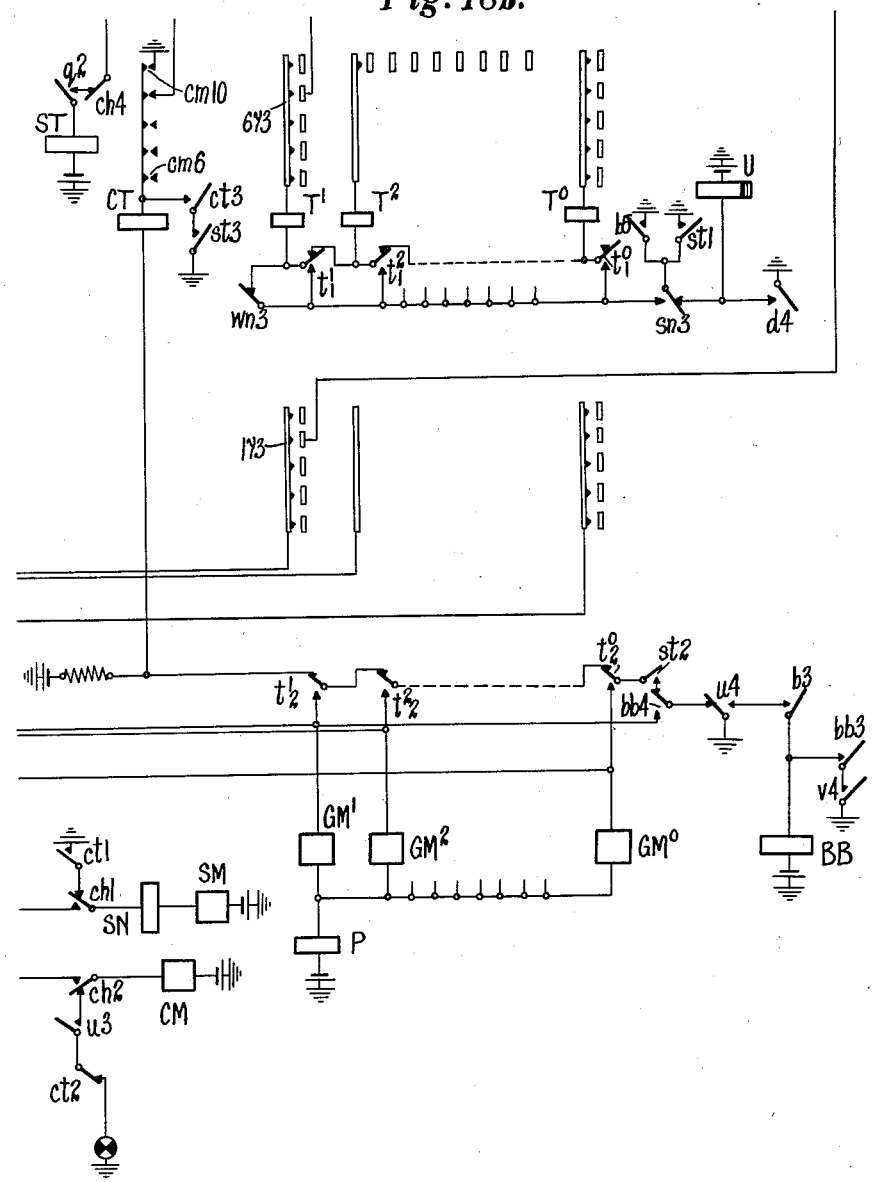

Figs. 14 to 18 show circuit arrangements for a switch and its control mechanism according to the invention. Of these figures Fig. 14 shows circuits suitable for the switching mechanism used as a group selector, Figs. 15 and 16 show circuits for a discriminating selector in which the switch is required to extend a connection in two directions at the same time and Figs. 17 and 18 show circuits which may be employed in the case in which the incoming call is received over one set of multiple conductors and is extended by the switch over another set of multiple conductors. Such a use may be found in the case of a switch in a P. A. X. which acts as a line finder and as a connector.

Reference will now be made to the embodiment shown in Figs. 1 to 12.

The frame for 10 switches and a common controlling mechanism comprises four vertical angle iron members 1, one at each corner of a rectangle, four transverse angle iron members 2, two at the top and two at the bottom secured to the members 1 and four tie rods 3 at right angles to the members 1 and 2 and secured to them at their intersecting points. One of the flanges of each of the members 1 is cut away at its ends to permit the member 2 to lie close against the other flange. The members 1 define the boundary of the group of switches, the members 2 extending beyond one pair of vertical members to provide support for the controlling mechanism. Parallel with the rods 3 are T shaped members 4, two for each switch and two for the control mechanism, the flanges of which are secured to the outside of the flanges of the horizontal members 2, the webs projecting into the switch assembly. The webs are slotted for a distance at the ends and adjacent to the flanges to allow them to pass over the flanges of the members 2. The function of these T shaped pieces is to act as guides for the individual switches.

Figure 1:
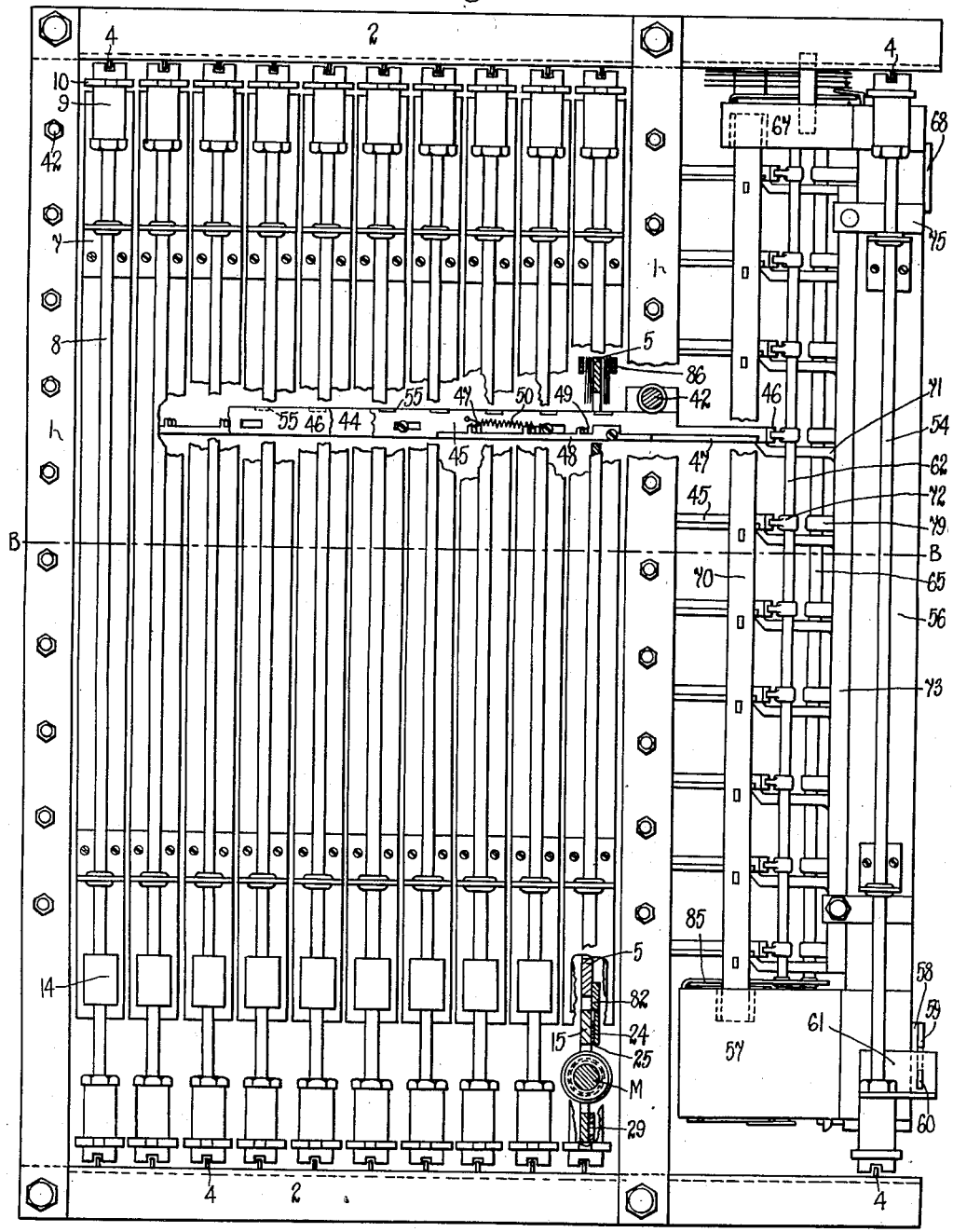
Figure 2:
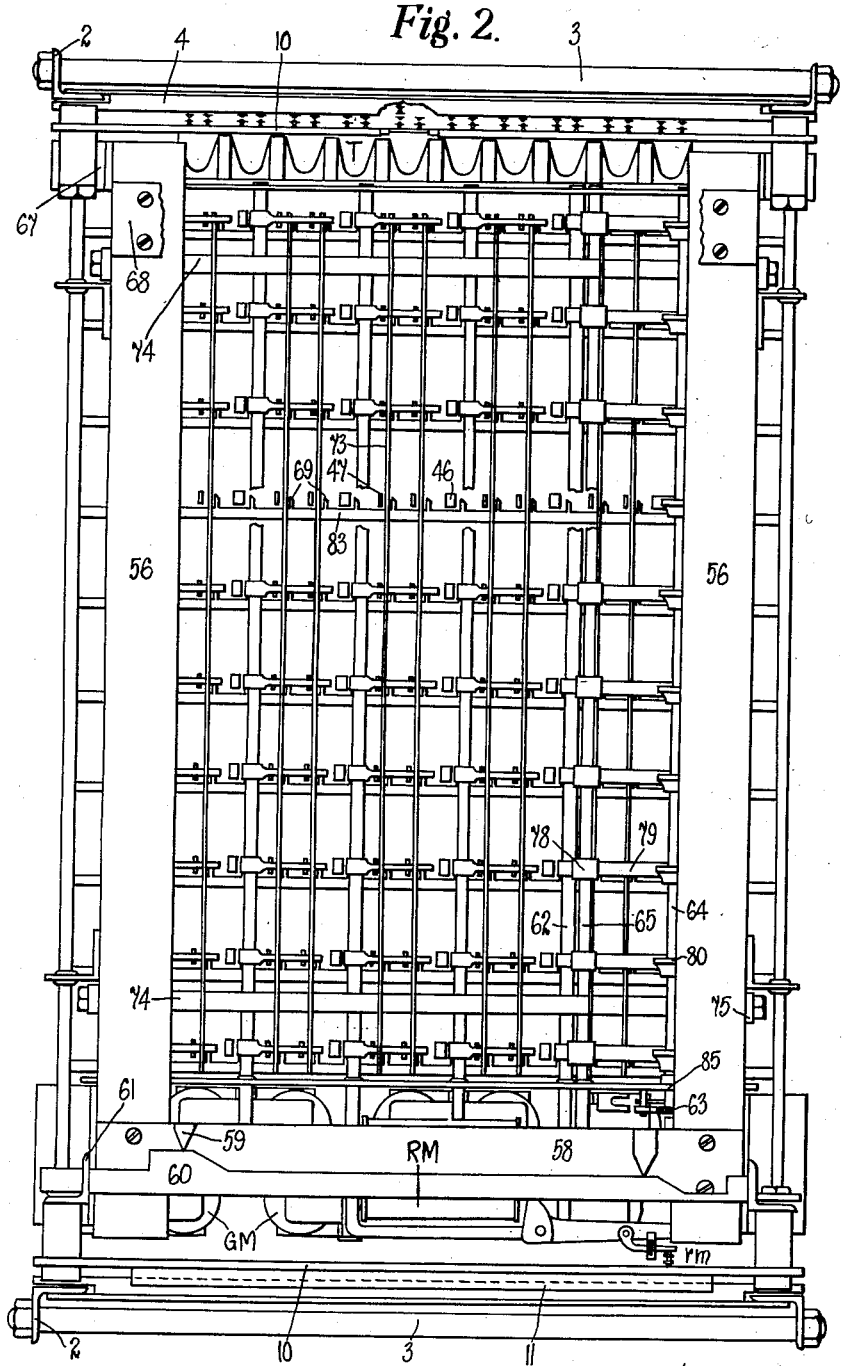
Figure 3:
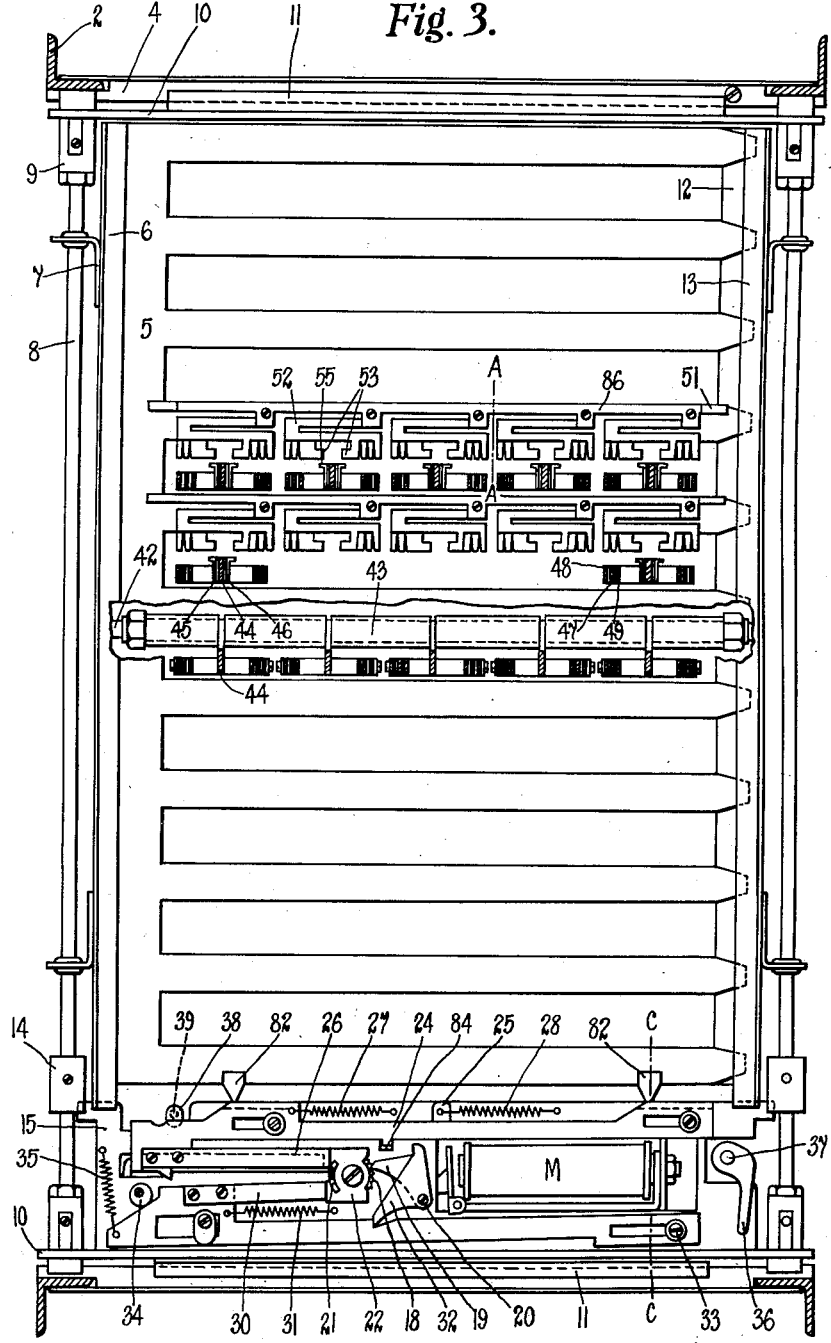
Figure 4:
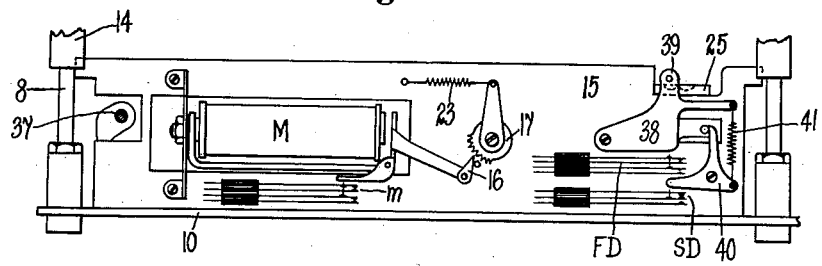
Fig. 4 shows a rear view of the plate carrying the switch magnet and contact operating mechanism.
Figure 5:
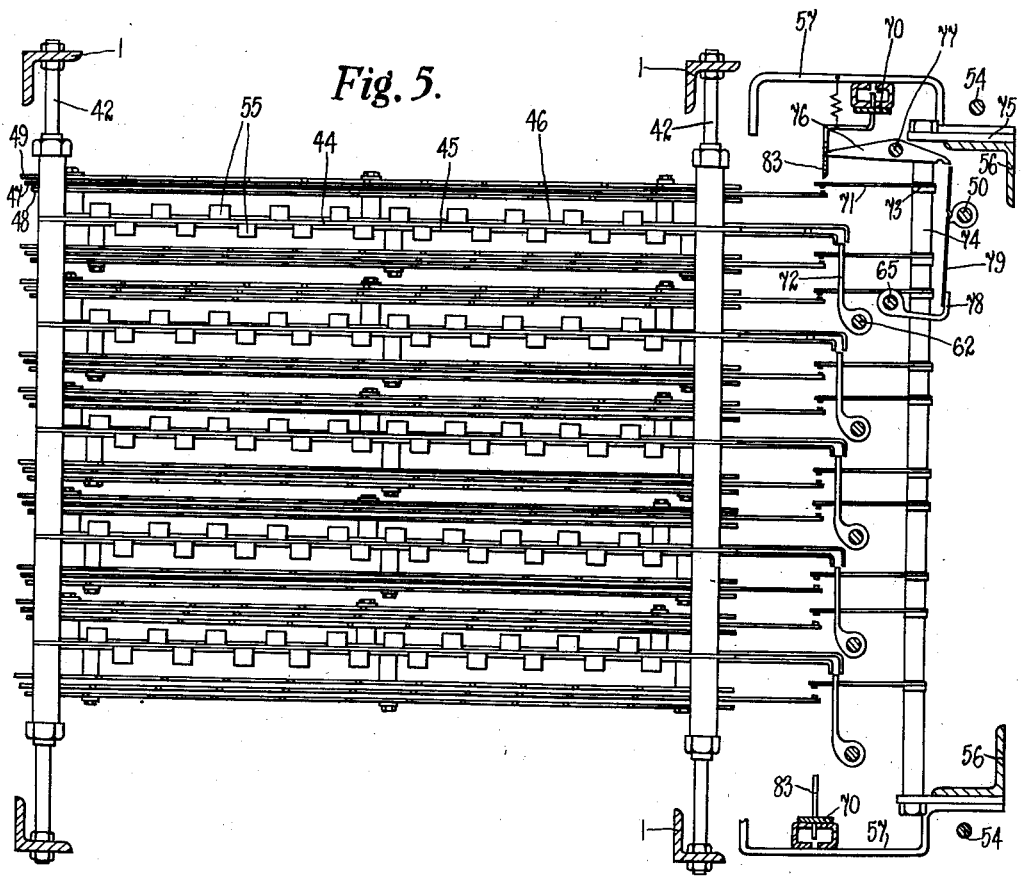
Fig. 5 shows a sectional plan view of the switch assembly and controlling mechanism taken along the line B—B in Fig. 1. The back of the plate on which the magnets of the common mechanism are mounted has been cut away and the magnets have been omitted from this figure in order not to complicate it.

A switch comprises a flat plate 5 cut so as to form a number of prongs joined together at one long end, each prong carrying the contacting parts for effecting connection with any outlet in a 'level', the outlets associated with the parts on each prong being the equivalent of a level in the well known two motion switch. The edge of the plate joining all the prongs is held between two angle iron members 6 provided with L shaped brackets 7 secured to the angle irons 6, the other limb of the bracket being drilled to embrace a vertical rod 8 provided at each end with an adjustable cap 9 the head of which is slotted to engage the web of the member 4. The cap 9 is constructed as follows: A tubular member is threaded externally at one end and is provided with a flange at the other end and a tubular collar is passed over it to within a short distance of the under side of the flange. The collar is held in position by a nut on the threaded end of the tubular member which is held on the vertical rod 8 which passes through it by a grub screw, the collar being slotted to permit of access to this screw, and the rod 8 being recessed to allow the grub screw to grip it. Between the collar and the flange of the tubular member at each end of a rod 8 is held a slotted end of a flat strip 10 running parallel with pieces 4 and held at its other end in a similar manner in another vertical rod. To a strip 10 are secured two angle irons 11, Figs. 2 and 3, spaced so that a flange of each stands up against each side of the web of the piece 4 providing a guide for and guarding against sideways movement of a switch plate when the switch is being inserted or withdrawn. The prongs of the plate 5 which may be stiffened by pieces of metal attached to them on each side, are wedge shaped at the free ends and adapted to engage correspondingly shaped recesses in a member 12 attached to angle irons 13 similar to the members 6 and held to a vertical rod similar to 8 at what may be termed the back of the switch assembly. Also secured to the vertical rod 8 is a collar 14 slotted along its cylindrical surface for a short length from one end to provide a recess into which a plate 15 enters and is held. There is a plate 15 for each switch and it lies in the same vertical plane as the corresponding switch plate 5 and is held in a suitable manner to the lower member 10. The plate 15 is shaped as shown in Figs. 3 and 4 and provides a base plate for the switch operating mechanism, the plate being cut away as required.

Secured to a bracket on the base plate and lying within a cut out portion thereof with its axis in the plane of the plate is the switch operating magnet M. The armature of the magnet is provided with an extension carrying a pawl 16 working between two stops and adapted to engage a ratchet wheel 17 mounted on a hollow pin passing through the plate 15. Also carried by the pin is a further ratchet wheel 18, on the opposite side of the plate 15 and adapted to be engaged by a spring controlled detent 19 pivoted at 20. On the outside of the ratchet wheel 18 and mounted on the pin is a disc with a peripheral projection 21 at one point which is bent at right-angles to the plane of the disc so as to protrude through a segmental slot in a plate 22 mounted outside it, the plate, disc and ratchet wheels all being held together between washers clamped by a bolt passing through the hollow pin.

The ratchet wheels when rotated tension a spring 23 anchored to plate 15 and to an arm on the ratchet wheel 17 to provide for their return when the pawl 16 and detent 19 are disengaged.

A heel piece attached to the magnet armature is adapted to operate contact springs $m$.

Carried by the plate 15 is a pair of trip rods 24 and 25, rod 25 lying between rod 24 and the plate 15, the rods being held by screws passing through slots in them. The rod 24 is of the shape shown in Fig. 3 and rod 25 is similar. A switch plate is provided with knife edges 82, which in the normal position rest on the upper edge of the trip rod 24 near ramps at its ends, the upper edge of rod 25 being somewhat below that of rod 24. When the switch is in its normal position as illustrated a trip latch 26 secured to the left hand end of rod 24 (Fig. 3) engages the projection 21 associated with the ratchet wheel assembly referred to, the low edge of the projection being also in engagement with the trip latch on rod 25, the two rods being held against the projection by the springs 27 and 28. On the same side of plate 15 as the trip rods is mounted a restoring rod 29 having a latch 30 and normally held against the tension of spring 31 by means of detent 32 pivoted at 20 engaging a notch in the rod. The rod can pivot about the securing screw 33 so that when it is moved to the right (Fig. 3) its left hand upper edge which is cut away engages projections on the trip rods. In its movement to the left during its operation after release it is guided by a cam 34 fixed in a suitable position but adjustable as to its bearing on the ramp on the lefthand edge of the rod 29, the ramp being kept in contact with the surface of the cam 34 by means of spring 35. The adjustment of the cam will be referred to later. The rod 29 after release by the detent 32 is restored by an arm 36 mounted on a rotatable shaft 37 running beneath and at the back of the switch assembly. On the under side of the upper part of trip rod 25 is a projecting piece 84 bent at right angles and adapted, when the rod is released to engage the upper part of detents 19 and 32 to disengage them from the wheel 18 and the restoring rod 29 respectively.

The trip latches are suitably bent near their free ends to allow the projection 21 to move behind them after the trip rods have been released.

Pivoted to a pin passing through the plate 15 near its left hand end (Fig. 3) and at the back thereof is an oscillating member 38. This will be seen from an inspection of Fig. 4 which should now be referred to. To a projecting part on the member 38 is secured a pin 39 adapted to enter recesses in the trip rods 24 and 25. In the normal position of the switch the pin rests on the upper edge of rod 24 and when this rod is released the recess in that rod is brought into line with the recess in rod 25 and the pin falls into the recess the member 38 turning about its pivot so that its under side presses on the contact springs FD closing them. When the rod 25 is released the pin 39 is lifted from the recess on to the upper surface of the rod and the contact springs FD are opened. At the same time a pin on rod 25 has moved away from one limb of a crank 40 which is turned in a counter-clockwise direction by means of the spring 41 when the member 38 is restored, the other limb of the crank 40 engaging the contact springs SD to operate them. During the restoration of the trip rods both of them move together so that the pin 39 does not drop into a recess and the contact springs FD are not operated. The springs SD are restored by the turning of member 40 due to engagement of the pin on the rod 25 with the upper member of the crank.

Running from the front to the back of the switch are a number of rods 42 there being two for each level. These rods are held in the vertical members 1 by means of nuts and a rod is furnished with a number of spacing pieces 43 over the major portion of its length which is of larger diameter than its ends and between which are clamped by nuts at the end of the large diameter part transverse carrying strips 44. Held to each side of a strip 44 are guide rods 45, 46, by means of screws passing through slots in the guide rods. The guide rods extend over all the switches in the assembly and a rod 42 carries as many guide rods as there are outlets from a level. In the example illustrated the switches have ten levels of contacts in the multiple, each level having ten outlets which are multiplied over the switches of the assembly. A guide rod is formed of a flat strip cut so as to leave projections 55 from its upper edge there being a projection corresponding to each switch in the assembly.

These projections are bent over at right angles to the plane of the strip 45, 46 and away from the carrying strip 44 and are adapted to engage contacting springs mounted on the switch plates. The guide rods are maintained in and restored after operation to a normal position by means of springs, e. g. the spring 50. Their ends which project beyond the switch assembly into the control mechanism are turned at right angles as will be seen in Fig. 5. Also carried by the strip 44 and spaced from it on either side are strips which form the multiple. On each side of the strip 44 there are three such multiple strips 47, 48, 49 providing the test conductors and the two speaking conductors. Each strip has upstanding projections spaced along its length to correspond with the spacing of the switches, the three strips of a set being displaced longitudinally so that the projections are not in line. The several projections along the length of a set of strips form a multipled outlet of a choice the end of a test conductor 47 of a set being seen projecting into the controlling mechanism in Fig. 1 and the projections on the speaking conductors being shown in either side of those of the conductor 47 in the sectional view in the cut away portion of Fig. 1.

Reference will now be made to the contacting springs mounted on the switch plate with reference to Fig. 3 and the perspective views in Figs. 6 to 10. On each of the prongs of a switch plate 5 are secured and insulated from it conducting members 51, a member having integral with it a number of flexible contacting members herein referred to as contacting springs. The members 51 are held against the prongs of plate 5 by a face strip 86. Each contacting spring 52 is in the form of an elongated U with its limbs parallel with the conducting strip to provide the requisite flexibility the end of one limb of the U extending at right angles and being connected with the conducting strip 51 the end of the other limb being shaped to provide a dependent portion 53 which is turned back in the direction of the limb and parallel to it. This portion, in the case of one of the contacting members extends also in the other direction for a length sufficient to extend over the multiple conductor nearest to the carrying strip 44. The other two contacting members are formed in a similar fashion but with a tooth depending in line with the corresponding multiple projection, the spring being cut away between the tooth and the backwardly projecting part to avoid contact between one spring of a set and a multiple conductor corresponding to another of the set when the springs are brought behind a multipled outlet with which contact is not to be made. The three contacting springs and the members 51 are separated from one another by insulating strips. The backwardly extending parts 53 of the three springs of a set lie close to one another but separated by insulation and are adapted to be moved laterally by a projection 55 on a guide rod.

Figure 6:
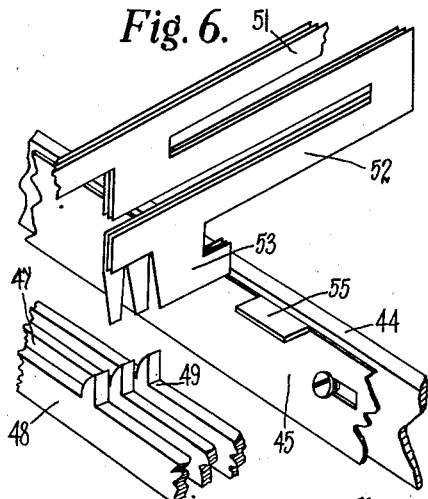
Figs. 6 to 10 show in perspective a switch contact member and a part of a set of multiple conductors and its associated guide rod for various positions of the switch, with respect to the multiple.
Figure 8:
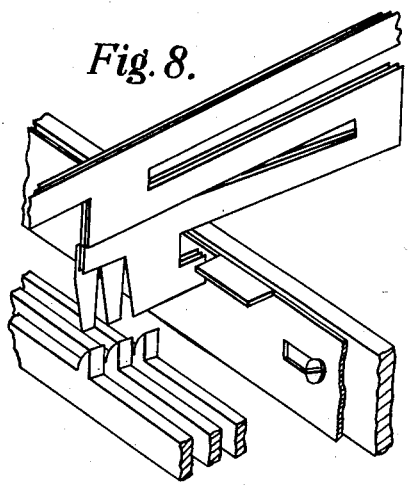
Figure 7:
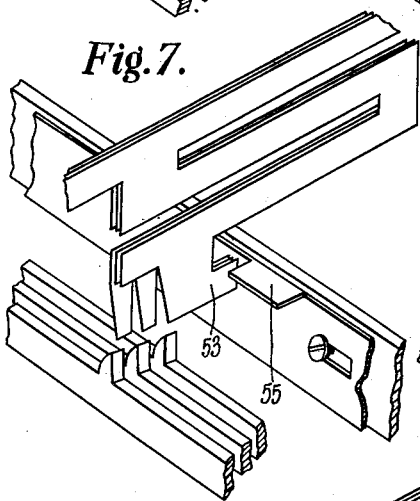
Figure 9:
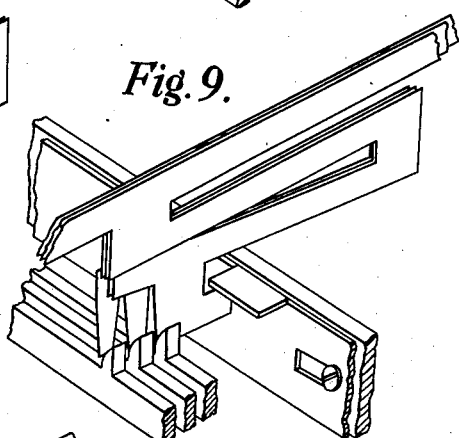
Figure 10:
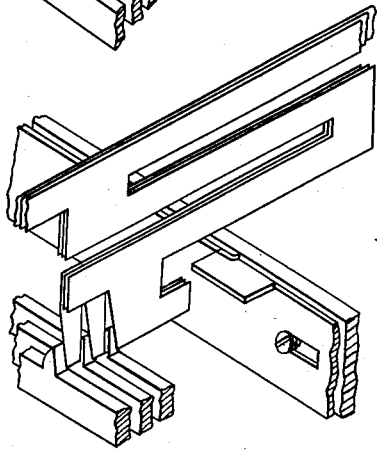
Figure 11:
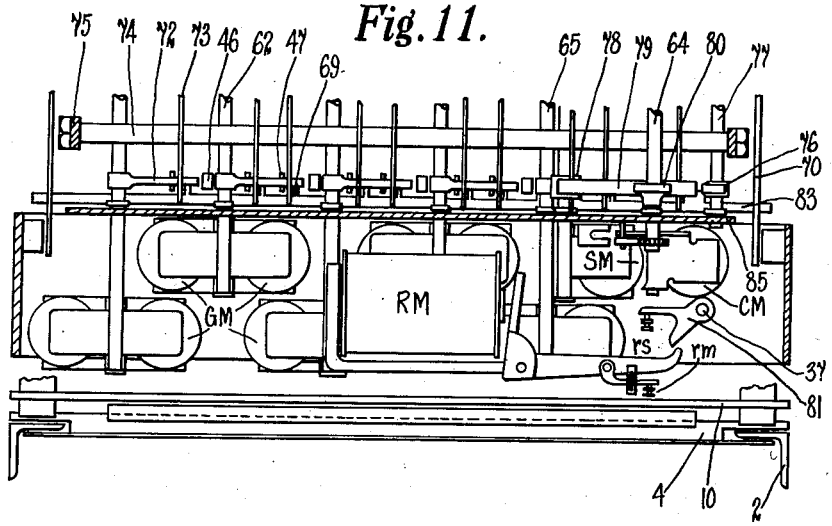
Fig. 11 shows an end view of the lower part of the common mechanism and is similar to Fig. 2 with the tie plate and supporting rod for the mechanism removed.
Figure 12:
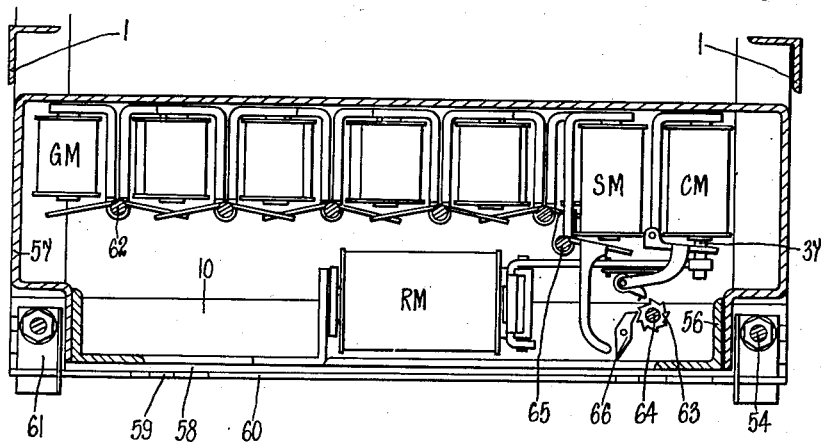
Fig. 12 is a sectional plan showing the magnets of the common mechanism of their mounting plate. The section is taken immediately above the magnets with the top plate designated 85 in Figs. 2 and 11 cut away.

In order to effect a connection a switch plate is lowered in a first stage by releasing trip rod 24 after which a guide rod corresponding to a selected outlet choice in the required level is operated and the switch plate is then lowered in a second stage after which the guide rod is restored. These operations will be described in further detail later. Referring now to the perspective views, Fig. 6 shows a guide rod and a set of contacting springs of a switch plate in the normal position. It will be seen that if the guide rod 45 is moved to the left the projection 55 will pass beneath the turned back part 53 and the contacting springs will be unaffected. In Fig. 7 the switch plate has been lowered in its first stage and the projection 55 on the guide rod will be seen to be in line with the part 53. When the guide rod is moved to the left the projection 55 pushes against the part 53 and the springs are flexed so that instead of being in a plane behind, that is, to the right of the multiple strip projections 47, 48 and 49 they are in a plane in front of them. When the switch is lowered in its second stage the teeth of the contacting springs will lie in front of the multiple projections and when the guide rod is released will be pressed firmly against them due to flexure of the springy members. These positions are shown in Figs. 8 and 9. Fig. 10 shows the position of the contacting teeth behind the multiple projections of a switch which has been lowered in its second stage but the outlet shown is not the one selected that is to say the guide rod shown in this figure has not been operated. The electrical connections to the contacting springs 51 may be made by connecting together all the contact springs of the several levels and connecting them by flexible connections to knife edge contacts mounted at a convenient position and engaging jacking points mounted on the frame. The electrical connections to the magnets M and its contacts and contacts FD and SD may be made in a similar manner.

Reference will now be made to the common controlling mechanism and Figs. 1, 2, 5, 11 and 12. A pair of vertical rods 54 similar to the rods 8 and supported in a similar manner have angle iron members 56 secured to them by means of brackets similar to the brackets 7. Secured to the angle irons 56 and near their lower ends is a plate 57 bent into a rectangular form of three sides only. Across the end of the assembly and also secured to the angle irons is a plate 58, provided with knife edges 59 which rest on a slidable rod 60 resting in brackets 61 carried by the rods 54. The rod 60 has two elevated portions on which the knife edges rest and when the rod is slid outwards (to the left in Fig. 2) the knife edges slide down the ramps on the plate 60 and rest on the lower part of the upper surfaces and the whole mechanism is lowered to enable it to be withdrawn.

Mounted on the back of plate 57, that is on the side next to the switch assembly are the guide rod magnets GM. The magnets are arranged in pairs the armatures of a pair being secured to a guide rod shaft 62 journalled in a plate secured to the magnet yokes. The armatures are biased by a spring for example, so that they normally assume the positions shown. Also mounted on the back of plate 57 are the cam shaft magnet CM and the shift rod magnet SM. The former is provided with an armature and pawl adapted to engage a ratchet wheel 63 on the cam shaft 64 journalled in a plate 25 formed by bending over the top of the plate 57. The shaft 64 is provided with a number of cams 80 the noses of which are helically displaced around the shaft and are situated opposite each level on positions on the shaft corresponding to each level. The cam shaft is held in a normal position by means of a spring (not shown). The magnet SM oscillates a shaft 65 by means of its armature which is provided with an extension acting on a detent 66, which, when the magnet SM is energized is disengaged from the ratchet wheel 63 to allow it to return to its normal position when the pawl controlled by magnet GM is disengaged on the release of that magnet. Mounted on the front plate 58 is the restoring magnet RM which, by means of an armature extension oscillates the restoring rod 37.

At the upper ends of the angle irons 56 is secured another plate 67 bent and secured in a similar manner to the plate 57 but provided with a bottom which may be bent up from the back. The bottom provides journals for the guide rod shafts, cam shaft and shift rod shaft, 62, 64 and 65. To the back of this plate are secured the test relays T. A plate 68, similar to the plate 58 is provided near the upper end of the angle irons 56.

Secured to the ends of plates 57 and 67 at the front and back of the assembly are members 70 provided with slots at each level of the switch in which the shift rods 83 lie. Each shift rod is provided with a number of projections 69 adapted to bring contact fingers 71 into engagement with the test conductors 47 of the outlets of the corresponding level and to bring the guide rods 45 and 46 into operative conjunction with the arms 72 secured to the shafts 62 at each switch level. These may be seen in Fig. 2 for the shift rod of the 7th level counting upwards where the guide rod and other shafts have been broken away for the purpose. The contact fingers 71 are flexible and are secured to stiff vertical members 73 which run vertically from the top to the bottom of this assembly. Each member 73 carries fingers for the same outlet choice of all the switch levels and is clamped to transverse rods 74 held to the angle irons 56 by plates 75 and is electrically connected to a test relay T.

Near its back end a shift rod is under the control of a lever 76, the several levers, one for each switch level being loosely mounted on a vertical shaft 77. At the end remote from the shift rod connection the lever is notched and the end of a flexible pawl 79 attached to arm 78 mounted on the shift rod shaft 65 is adapted to be brought into operative conjunction with the lever by means of the relevant cam 80 on the shaft 64 when the magnet SM is energized and the pawl engages the notch and operates the lever which is held so long as the magnet SM remains energized.

The restoring magnet RM actuates the restoring shaft 37 which runs behind and below the switches of an assembly by means of a lever 81, an arm of which operates contacts rs in a manner to be described. The armature of magnet RM also actuates contacts rm. The restoring shaft is provided with an arm 36 for each switch and when the rod is oscillated the several arms are brought into contact with the restoring rods 29 of released switches to bring about their restoration.

If it is desired to withdraw a switch from the assembly the nuts on the caps 9 of the back rod of the switch are slackened and by gripping the rod it may be withdrawn taking with it the angle iron members 13 and the guide member 12, the rod pulling out of the slotted ends of the member 10.

By gripping the front rod 8 of the switch the switch plate 5 and base plate 15 may be withdrawn from the front of the switch the plate being prevented from tilting by means of the angle iron members 11 at the top and bottom. It will be seen from Fig. 3 that the withdrawal of a switch may be carried out without disturbing the multiple or the guide rods, the electrical connections being made over knife edge contacts or by easily undone connections as already explained.

To withdraw the common controlling mechanism the rod 60 is pulled towards the front of the assembly permitting the whole mechanism to be lowered from the elevated part of the upper edge of the rod 60 to the lower part of this edge. This lowers the fingers 71 clear of the test conductors 47 and the shift and guide rod operating members clear of the multiple and guide rods. By gripping the front rod the whole mechanism may be withdrawn from the front, the electrical connections to the magnets and relay being made as before.

When either a switch or the common control mechanism is withdrawn the multiple is not disturbed and the guide rods remain in position since these are supported by the switch frame members 1.

The operation of a switch and the control mechanism for effecting a connection will now be described. A switch can only be taken into use if the common controlling mechanism which may be associated with it is free. When a switch is taken into use magnet M is energized and by means of the pawl 16 turns the ratchet wheel 17 through the space of one tooth. This brings the projection 21 secured to the ratchet wheel spindle out of the path of the trip latch 26 but not yet out of the path of the trip latch of trip rod 25. The latch 26 being released the trip rod 24 moves to the right (Fig. 3) under the influence of spring 27 and the switch plate 5 is lowered by the knife edges 82 sliding down the ramps on rod 24 until they reach the upper edge of the other trip rod 25. Due to the movement of rod 24 the pin 39 on the oscillating member 38 falls into the grooves in the upper edges of the trip rods which are now in line and the heel of member 38 depresses the contact springs FD, closing the contacts. The switch is now electrically connected with the electrical parts of the controlling mechanism and magnet M remains energized. The impulses for selecting the desired level of outlets are received in the controlling part and take effect on magnet CM which rotates the cam shaft 64 by means of the pawl and ratchet 63 to bring by means of the helically positioned cam noses the flexible pawl 79 of the shift rod mechanism into operative conjunction with the lever 76 associated with the desired level. This operation selects the level in which the shift and guide rods are to be operated and at the end of the impulse train magnet SM is energized, turns the shaft 65 and by means of the arm 78 attached to the selected flexible pawl 79 brings the latter into engagement with lever 76 which turns about the shaft 77 and moves the shift rod 83 of the selected level (downwards in Fig. 5). Detent 66 is withdrawn from ratchet wheels 63 and the cam shaft is released. The shift rod by means of projections 69 along its length brings the fingers 71 into engagement with the test conductors 47 of all the outlet choices of the selected level and the flexible ends of the guide rods for all the outlet choices into operative conjunction with the arms 72 on the guide shafts 62. The fingers 71 connect the test conductors of the outlets to the test relays T and the relay connected to the first free outlet in a pre-arranged order operates and brings about the energization of the guide rod magnet GM corresponding to the multipled outlet selected by the operated test relay. The shaft 62 is turned and arm 72 either pushes rod 45 or pulls rod 46 as determined by the guide rod magnet operated. The guide rod being operated the projections 55 pass below the parts 53 of unoperated switches (Fig. 6) above these parts of switches already in use (Fig. 9), and in the case of the switch under consideration pushes against the part 53 flexing the contacting springs and moving the teeth from behind the multiple projections to the front of them (Fig. 8). Magnet M is now de-energized but the ratchet wheel assembly is held by the engagement of detent 19 with the teeth of ratchet wheel 18. Magnet M is then re-operated automatically and turns ratchet wheel 17 through the space of another tooth thereby bringing the projection 21 out of the path of the trip latch of trip rod 25 and projecting it into the path of latch 30 on the restoring rod 29. The latch on rod 25 being freed the rod moves to the right (Fig. 3) under the influence of a spring 28 and the knife edges 82 slide down the ramps on its upper surface to a lower part of the surface and the switch plate 5 is lowered in its second stage. The movement of rod 25 causes the projection 84 to strike against the upper part of detent 32 knocking it out of engagement with the notch on the restoring rod 29. Rod 29 is however held by the projection 21 in the path of latch 30. Consequently on the movement of rod 25 pin 39 is forced out of the recesses in the upper surfaces of the trip rods and contact springs FD are restored. In its restoring movement member 38 takes with it by means of spring 41 the bell crank 40 which operates the contact springs SD. The lowering of the switch plate 5 in its second stage brings the teeth on the contacting springs in front and in line with the multiple projections and the re-release of springs FD bring about the release of the shift and guide rod magnets and the rods are restored. The springs SD place the switch under the control of the calling subscriber and the common controlling mechanism is freed. Magnet M remains energized.

To release the switch after conversation magnet M is released and its pawl is withdrawn from ratchet wheel 17. Detent 19 being no longer in engagement with wheel 18 the ratchet wheels are restored to their normal position by means of spring 23, the projection 21 passing behind the latches on the trip rods which are suitably shaped for the purpose. Latch 30 is now free and the restoring rod 29 moves to the right (Fig. 3) under the influence of spring 31 and by pushing against arm 36 turns it in a counter clockwise direction (Figs. 3 and 11) causing contacts rs to close. Circuit arrangements may provide for this to be inoperative if the controlling mechanism is in use and if free or when it becomes free contacts rs are effective in closing a circuit for the restoring magnet RM. The magnet attracts its armature and by means of its extension acts on the crank 81 to turn the shaft 37 in a clockwise direction. Arm 36 now pushes the restoring rod 29 to the left. Due to the action of the spring 35 the left hand end of rod 29 was lifted when the rod was released, the amount of lift being controlled by the width of the slot at the left hand end of rod 29. This is so adjusted that the vertical edge of the rod at the upper end of the ramp is brought in line with the projections on the lower edges of the trip rods the adjustment being such that as the rod is pushed to the left carrying the trip rod with it engagement with the cam 34 causes it to free itself from the rods as soon as the trip latches pass over and assume a position in which they are held by the projection 21. Further movement of the rod 29 for the purpose of bringing about engagement of detent 32 with the notch in the rod is then made without the necessity of moving all the switches which are not in use. The magnet RM which on operating opens contacts rs by movement of the crank 81 also when the armature is fully attracted, opens contacts rm which releases the magnet and the switch is in position for use on another call.

A modification will now be described with reference to Fig. 13 in which in place of the guide rods the multiple itself is rotated to cause contacting springs on a switch plate to engage the multiple, the springs associated with the selected free outlet only being brought into engagement with the multiple the other springs passing clear. The figure merely shows a portion of the multiple for one outlet choice and its operating mechanism and a set of contacting members for one outlet of one switch as from a consideration of the embodiment shown in the preceding figures the modification will be apparent to those skilled in the art. The multiple as regards one outlet choice, consists of strips, one for each conductor with projections from one edge, there being a projection for each switch in the assembly, the projections being spaced equally with the switches. The strips 87 are supported by an insulating member 88 having one edge 89 bent over at an acute angle in the direction of the switch contacting members 90. The projections 91 on the multiple conductor strips are bent over the edge 89 as will be seen. The insulating members 88 are fastened to rotatable parts 92 which rotate in the plates 93 which may be fixed to the assembly in the place of the rods 42. One end of a set of multiple conductors is secured to and insulated from an angle or T member 94 which may be fastened to the vertical members 1 at one end of the assembly, and this end of the multiple conductors is connected to the outlet cables to the succeeding apparatus. The other end of the speaking conductors of the multiple terminates at the end of the strip 88 but the test conductor passes through member 92 at the end of the assembly next the common mechanism and is turned through a right angle, projecting from the member 92 as shown at 47. The contacting members 90 of a switch are formed of resilient material and depend from the stem of a T shaped conducting strip, the strip having as many stems as there are outlet choices. The dependent ends of the contacting members are bent to correspond with the angle of the part 89 with the strip 88. The contacting members are supported by and insulated from channel shaped strips 96 which are secured to or take the place of prongs of plate 5 in a suitable manner.

Reference will now be made to the mechanism shown at the right hand side of the figure to the right of the plate 93. Shaft 62 is the guide rod shaft which, by means of the backwardly projecting arm moves the members 97 longitudinally to left or right. The member 97 is provided with upstanding projections 98 and 99 which can partially rotate the members 92. Since the guide rod shaft 62 is common to the same outlet choice of all the levels from the switches the projections 98 and 99 are only brought into operative conjunction with the tongues 100 and 101 on the members 92 of the level required and this is achieved by the selection of a shift rod 83 as in the embodiment described in detail with reference to Fig. 5. The rod 83 is provided with projections as before to bring the contact fingers 71 into contact with the test conductors 47 to connect the latter to the test relays and is also provided with downward projections for each pair of outlets a projection being adapted to engage the bell crank 95 loosely mounted on shaft 62. The long arm of crank 95 is connected by a tie rod to the member 97 to bring the projections 98 and 99 into operative conjunction with the tongues 100 and 101 and the rotation of the shaft 62 in one direction or the other then rotates either the left hand or right hand member 92 in the direction indicated by the arrow.

When the multiple is rotated the projections 91 are brought into the path of the members 90 and the switch is then lowered until the contacting members making connection with the projections 91. When the multiple is restored on restoration of the shaft 62 the members 90 are sprung outwards and remain in contact with the projections. Any further movement of the switch causes the members 90 to slide down and to remain in contact with the projections 91.

The members 90 associated with an unselected outlet when the switch is lowered pass behind the turned up lip 89 and no electrical contact is made while in the case of unoperated switches the rotation of the multiple causes the projections 91 to pass clear of the members 90. It may, however, be arranged that the lowering of the switch in its first stage does not bring about connection between the switch and the multiple, the contacting members 90 being merely positioned above the multiple so that when the latter is rotated no contact is made and the lowering of the switch in its second stage causes the members 90 to contact with the projections 91 and to remain in contact therewith after the multiple has been restored.

Circuit arrangements suitable for a selecting switch and a common controlling mechanism as described for Figs. 1 to 12 will now be described in connection with Fig. 14.

The circuit of an individual switch is shown above the dotted line and the circuit of the controlling mechanism below the dotted line. The magnets shown in the figures illustrating a mechanism embodiment of the invention and the contacts set there shown are given the same designations in Fig. 14.

A free selector which is an intermediate group selector the common controlling mechanism of which is also free is indicated by the presence of a full battery potential on the test wire $c$ the precise effect of which will be perceived later when considering the testing for a free outlet from the selector shown in the figure.

When connection is made with the multiple by the preceding selector earth is connected directly to the test wire and magnet M in the individual selector seized and relay N in the common circuit operates. Relay N locks itself to the test wire over contact $n1$, closes a point in a holding circuit for relay D at contact $n2$ and a point in the testing circuit at contact $n3$ and guards relay RL and magnet RM against premature operation at contact $n4$. Operation of magnet M releases trip rod 24 (Fig. 3) and the selector is lowered its first stage closing contacts FD. Contact $fd1$ connects the right hand winding of magnet M in series with the two windings of relay Q but owing to the high resistance of the right hand winding of relay Q right hand winding of relay M does not receive sufficient current to make it effectively differential in action; relay Q however operates. Contact $fd2$ connects the left hand winding of relay A to the lower speaking wire. Contact $q1$ opens in the testing-in circuit, contact $q2$ prepares a holding circuit for relay SN and magnet SM, contact $q3$ closes a circuit for relay U which thereupon operates, contact $q4$ opens the operating circuit of magnet RM and connects earth for operating the guide rod magnet GM of the choice to be selected later, contact $q5$ connects relay S to a time pulse circuit and contact $q6$ prepares a locking circuit for relays S and Z of the time pulse combination. Consequent on the operation of relay A over the lower speaking wire relay D operates in a circuit over contacts $a1$, $sn2$ and $cs1$ and prepares a holding circuit for itself during impulsing at contact $d1$. At contact $d2$ a circuit is prepared for the repetition of impulses to cam shaft magnet CM; at contact $d3$ the circuit of magnet SM is guarded against operation of contact $cs1$ and at contact $d4$ a point in the test circuit is opened. Contact $cs1$ changes over when the cam shaft leaves its normal position.

Impulses are now received by relay A and are repeated at contact $a2$ to magnet CM in a circuit from earth over contacts $bb3$, $d2$, $a2$, $b3$ magnet CM to battery. Contact $a1$ closes during the release of the impulse relay in the holding circuit for relay D to maintain that relay energized during impulsing. Magnet CM responds to the impulses and rotates the cam shaft to select by means of its cams the spring pawl attached to the arm oscillated by magnet SM corresponding to the level designated by the received digit. The cam shaft contacts $cs1$ are changed over leaving relay D dependent on relay A. At the end of the impulse train relay A remains operated and relay D releases. Contact $d3$ closes a circuit over contacts $cs1$, $bb2$, and $b2$ for relay SN and shift magnet SM. Magnet SM withdraws the retaining pawl from the cam shaft ratchet wheel but before doing so by rotating shaft 65 it causes the spring pawl to engage the notch in the lever 76, to push the shift rod and to bring about the engagement of the contact fingers 71 with the conductors of the multiple of all the choices of the selected level thereby connecting the test relays $T^1$ to $T^0$, to the test conductors of the ten outlets of the selected level. The cam shaft returns to its normal position under the influence of a spring and contact $cs1$ is restored. Relay SN operates in series with magnet SM and at contact $sn1$ opens a further point in the test in circuit. Contact $sn2$ opens to guard against operation of relay D on the reclosure of the back contact of contact $cs1$, contact $sn3$ closes a locking circuit for relay SN and magnet SM over contacts $q2$, $d3$, $bb2$ and $b2$. Contact $sn4$ connects earth over contacts $q3$, $n3$ and $d4$ to the left hand windings of all the test relays and releases relay U. The outlets in the selected level are now tested. The conditions that may exist on a test contact and their effects on a test relay will be considered.

(I) If the test conductor is disconnected the relay will be differential and will not operate.

(II) If the outlet is busy and the test conductor is at earth potential no current or only a very small one will flow from the test conductor through the right hand winding of the test relay due to the connection of the rectifier in the circuit of the test conductor but current will flow from earth over contact $q3$ through both windings and the relay being differential will not operate.

(III) If the outlet is busy and at half battery potential by reason of a connection of the multiple over the test relay of another control circuit the relay is unoperated as the junction point of its two windings is also at the same potential and the relay is differential.

(IV) If the outlet is free it will be at battery potential and current will flow over the left hand winding of the relay to the test conductor and also over the right hand winding but the current in the left hand winding being increased and the current in the right hand winding being reduced the balance of the relay is upset and the relay operates. Contact $t1$ disconnects the right hand winding and the relay continues to hold over its left hand winding and the potential on the test conductor will be reduced to a value less than the full battery potential but greater than the busy potential and the outlet will consequently test engaged to other switches under the condition described in (III).

When contact $sn4$ closes earth is connected to all the test relays and the first relay in the series associated with a free outlet will operate and disconnect the remainder at its contact $t2$ which also connects earth directly to the holding winding to guard against its release should a switch in use in the same level become free and connect battery to a test relay earlier in the series.

When relay U releases earth is connected over contacts $q4$, $u1$, $bb4$, the contact $t3$ of the operated test relay the magnet GM corresponding to the choice selected by the test relay, relay P to battery. The magnet GM operates and moves the selected guide rod to move the contacting springs of the selector concerned into position in front of the multiple projections so that when the selector is lowered in its second stage the contacting springs are brought into engagement with the multiple. Relay P operates and at contact $p1$ closes a circuit over relay R and an interrupter contact. Contact $p2$ disconnects the left hand winding of relay S from the time pulse circuit. Relay R is operated intermittently by the interrupter springs. Contact $r1$ opens the circuit for the high resistance winding of relay Q and connects the right hand winding of magnet M in the low resistance circuit over the left hand winding of relay Q. Magnet M being differentially wound releases but this has no effect on the operation or position of the switch. When relay R releases, the high resistance winding of relay Q is again connected in circuit with the right hand winding of magnet M and the magnet being thereby unbalanced operates and brings about the lowering of the selector in its second stage, in which the contacting springs are brought into contact with the multiple of the selected outlet. Contacts FD are now opened and contacts SD are operated. Contact $fd1$ releases relay Q, and contact $fd2$ releases relay A. Contact $sd1$ releases relay N and connects battery over contact $m1$ to the left hand winding of magnet M. Earth on the outgoing test conductor is applied and maintained at contact $m2$ to mark the outlet busy and to hold the succeeding switch.

On the release of relay Q magnet SM and relay SN are released at contact $q2$, the operated test relay is released at contact $q3$ and the guide rod magnet GM and relay P are released at contact $q4$. Contacts $q1$ and $sn1$ closing the common control circuit again becomes available for use.

Relay P opens the circuit for relay R at contact $p1$.

If there should be no free outlet in the row selected in accordance with the received impulse train none of the test relays operates. After an interval relay U releases and closes a circuit from earth over contacts $q4$, $u1$, $bb4$ contacts $t^0 3$, to $t^0 3$ of the test relays in series, contact sn5, relay B to battery. Relay B operates and at contact b2 releases relay SN and magnet SM. Contact sn4 re-closes the circuit of relay U which on operating closes a circuit for relay BB over contacts q4, u1 and b1. Relay BB operates and locks up over contact b5 and relay B releases. Contact bb1 holds relay A by means of its right hand winding, contact bb2 prepares a circuit for relay SN and magnet SM which is closed when relay B releases. Contact bb3 operates magnet CM during the release period of relay B thereby causing the cam shaft to be rotated to bring the spring pawl of the magnet SM into operative conjunction with the shift rod lever of the first level and contact bb4 prepares a circuit for magnet GM⁰. Consequent on the operation of magnet SM following the release of relay B the shift rod associated with the first level is operated and consequent on the operation of magnet GM⁰, the contacting springs of the switch are brought into position to contact with the 10th choice in the selected level. This outlet is not connected to a succeeding selecting circuit but may be connected to a circuit from which a busy signal is given.

Relay P operates and brings relay R under the influence of the interrupter. Magnet M is released and reoperates as previously described and contact is made by the switch with the selected outlet.

At the end of a conversation when the calling subscriber clears or when he clears after receiving a busy signal earth is disconnected from the incoming test wire. Magnet M is de-energized and contact m2 disconnects earth from the outgoing test conductor to release succeeding circuits. Contact m1 opens to guard against seizure until the switch has been restored.

The restoring rod 29 is released and springs to the right (in Fig. 3) pushing the arm 36 on the restoring shaft 37 and turning the latter thereby closing the contacts rs by means of the crank 81. In the circuit diagram these contacts close a circuit for magnet RM and relay RL if the common control mechanism is free. If it is not free the circuit is closed on the release of relay Q when the circuit becomes free. Relay RL operates and closes contact rl1 to maintain the circuit of magnet RM and relay RL until the magnet has been fully operated. The operation of the magnet turns the restoring shaft 37 and by means of the arms such as 36 pushes to the left the restoring rods of as many switches as are awaiting restoration.

Contact rs opens on the initial restoring movement of the shaft and contact rm opens at the end of the magnet's armature movement to release the magnet and relay RL. The action of the restoring magnet and rod in restoring the switch have been fully described in connection with the description of the mechanical embodiment of the invention.

It will be remembered that when the common control circuit is taken into use earth is connected to the left hand winding of relay S at contact q5. The left hand windings of relays S and Z are connected to battery connected cam operated springs which are closed momentarily at periodic intervals. On the first closure of the lower cam contact after the operation of relay Q relay S operates and locks up over its right hand winding and contacts s1 and q5. Contact s2 connects the left hand winding of relay Z to the upper cam contact. When battery is connected to the upper cam contact relay Z operates and locks up over its right hand winding and contacts z2 and q6. Contact z1 closes a circuit for relay SN and magnet SM which operate but if no impulses have been received magnet CM will not have been operated consequently no shift rod is moved by magnet SM. Contact sn2 releases relay D and contact sn4 releases relay U. Since no shaft rod is operated the test circuits are not closed and on the release of relay U relay B operates. Relay B releases relay SN and magnet SM and relay U re-operates and closes the circuit for relay BB and magnet CM operates and the connection to the 10th outlet in the first row is made as described for the case when no free outlet was found.

If, after seizing a selector and its common control circuit the caller clears without transmitting the impulses for the setting of the selector the release of relay A holds relay D at contact a1 and closes a circuit for magnet CM over contacts bb3, d2, a2 and b3. The cam shaft is rotated to select the spring pawl of the first level but since relay D is held relay SN is not operated and the test circuit is not closed.

Relay N releases consequent on the removal of earth from the incoming test conductor and releases relay D, contact n1 opening to guard the common control circuit at this time, and n3 opening to guard the test circuit. Magnet M releases. Relay D releases operates magnet SM and relay SN and releases magnet CM. Relay SN and magnet SM lock up over contacts sn3 and q2 and relay U is released. Relay B operates, releases relay SN which re-operates relay U. Relay BB operates re-operates relay SN which then releases relay U.

Magnet GM⁰ and relay P then operate the latter operating relay R. Closure of contact r1 energizes the right hand winding of magnet M which lowers the switch in its second stage and contact is made to the 10th outlet in the first level as described earlier.

The circuit arrangements for a selector and common control circuit arranged as a discriminator will now be described with reference to Figs. 15 and 16, the switch being of the modified form as described in connection with Fig. 13. The selector is shown as being selectable from a preceding circuit which for the sake of example may be assumed to be a preselector. It is provided with a feeding bridge and relay contacts are provided in the contactor circuits. The arrangement is such that the numbers obtained consequent on dialling the digit corresponding to the first two levels are all local to the exchange in which the switch is situated; the numbers obtained consequent on dialling the digit corresponding to the third level may be either local or otherwise depending on the digits subsequently dialled and the numbers obtained by dialling all other digits definitely require the use of a junction to the main exchange. Discrimination therefore in the case of calls over the third level takes place at the succeeding rank of switches. As is usually the case with discriminators a discriminating selector when seized searches for and connects with a junction to a main exchange. The contactor springs on the switch appropriate to the level giving access to main exchange junctions are not connected with springs of other levels. Three trip rods on the switch are employed the first one to be released bringing about the connection of the switch to the common control circuit. The contactor springs appropriate to the junction level make contact with the junction multiple when the switch is lowered in its first stage, i. e. on release of the second trip rod while the first stage movement of the switch brings the contactor springs appropriate to other levels into position, above the multiple, contact being made on the second stage movement of the switch.

The selector tests free due to battery potential on the test wire $c$ over relay N and contacts $sn1$ and $q1$ in the common control circuit, contact $lt1$, left hand winding of switch magnet M, contact $v2$, winding (III) of relay AL, contact $e1$ and resistance to the $c$ wire. Relay AL operates and when the connection is switched through holds over the loop and its windings (I) and (II). Contact $al1$ closes the circuit of the slow releasing relay V. Relay V operates and at contact $v1$ connects battery to the incoming test wire to hold the preselector and contact $v2$ connects earth directly to magnet M, contact $v3$ closes operating circuits for relays JT and LO which operate and lock up over contacts $jt2$ and $h1$ and contacts $lo2$ and $y1$ respectively. Contacts $lo1$ and $jt1$ close a circuit for relay E which operates and locks up over contacts $e4$ and $v4$. Contacts $e2$ and $e3$ leave relays LO and JT dependent on their locking circuits. Magnet M and relay N operate. Magnet M releases the first trip rod but the switch does not move at this stage the contact carrying plate resting on the second trip rod the upper edge of which is coincident with that of the first trip rod. Contacts $n1$, $n2$ and $n3$ perform the same functions as in Fig. 14 and contact $n4$ opens a point in the circuit of relay R. The release of the first trip rod brings about the closure of contacts $ft1$, $ft2$, $ft3$ and $ft4$. Contact $ft1$ connects the high resistance right hand winding of relay Q in series with the right hand winding of magnet M, and contact $ft2$ connects relay A to the lower speaking wire and that relay operates over contact $al2$ and the retard coil RC. Relay Q operates and contact $q2$ connects earth over contacts $g2$, $bb2$, and $b2$ to relay SN and magnet SM. These operate and magnet SM operates the shift rod of the main exchange junction level, the cam on the shaft rotated by magnet CM being normally in position for the operation of this shift rod. Relay U is operated over contact $q3$. Operation of relay A closes the operating circuit of relay D at contact $a1$. Contact $sn4$ opens the circuit of relay U and closes the circuit for the test relays. Test is made for a free outlet to a main exchange junction and one of the test relays operate and brings about the operation of the appropriate guide rod shaft for the positioning of the appropriate multiple as described in connection with Fig. 14. Relay P operates and at contact $p3$ connects the low resistance left hand winding of relay Q in the circuit for the right hand winding of magnet M and magnet M being differentially wound releases. Contact $m2$ closes the circuit of relay F over contact $p4$ and that relay operates and locks up over contact $f3$. Contact $f1$ re-connects the high resistance winding of relay Q and magnet M re-operates. Contact $f2$ operates relay G which locks up over contacts $g1$ and $q1$. On the magnet M operating the second trip rod is released and the switch drops in its first stage and contacts with the selected junction outlet over which the speaking and test wires are extended over contacts $jt4$, $jt5$ and $jt6$. Contact $g2$ opening relay SN and magnet SM are released but relay D being slugged does not release before $sn2$ has closed. The shift rod associated with junction outlets is released, relay U is re-energized and the test relay and magnet GM and relay P are released. Relay F releases.

Impulses are now received and relay A responds repeating the impulses to magnet GM which rotates the cam shaft to select the shift rod of the required level and operates contact $cs1$. At the end of the impulse train relay D releases reclosing the circuit of relay SN and magnet SM over contacts $cs1$ and $d3$. If the digit received definitely determines that the call is a local one level 1 or 2 will have been selected and contacts $sr1$ or $sr2$ closed by the shift rod of level 1 or 2 closes a circuit over contact $d4$ for relay L. Relay L operates and at contact $l1$ connects battery over a high resistance to the upper speaking wire. Relay H operates but relay Y which is marginal does not. Contact $h1$ releases relay JT which opens the junction circuit and releases it and at contact $jt2$ prevents its own re-operation and at contact $jt3$ holds relay LO. A free outlet in the selected local level is selected by means of the test relays and the multiple unit of the selected outlet is rotated so that the contacting springs corresponding to this multiple will engage the multiple when the switch drops in its second stage. Operation of relay P in series with the guide rod magnet GM releases magnet M which is followed by operation of relay F which again brings about operation of magnet M and the switch drops in its second stage due to release of the third trip rod. The contacts closed at the first stage drop are opened and relays A and H release. Contact $lt1$ is operated on the second stage drop and releases relay N but magnet M remains held over its contact $m1$. The common control circuit is released as described in connection with Fig. 14. The call is extended over the contacting springs of the selected outlet and contacts $lo4$, $lo5$ and $lo6$ the outlet being guarded by the connection of earth over contact $lo6$ which brings about the operation of the magnet of the seized selector and the relay in its common control circuit corresponding to relay N.

When the connection has been extended to the wanted subscriber and he replies relays Y and H operate. Contact $y3$ prepares a circuit for relay SS of a pair of relays associated with a cam device for metering after a delay period. Battery connected to wire MS operates relay SS which locks up over its middle winding. After a suitable predetermined delay period battery is connected to wire MZ and relay ZZ operates, holds during the period of battery application to wire MZ and opens the locking circuit of relay SS. While both relays SS and ZZ are operated increased current flows over the incoming $c$ wire from battery over contacts $zz1$ and $ss1$ and the subscriber's meter is operated. Relay ZZ locks up over its right hand winding.

A call to be completed over the junction is set up in a similar manner up to the receipt of the impulse train. On the release of relay D relay J operates in place of relay L and contact $j1$ holds relay U. An outlet in the required direction has already been chosen and contact $j2$ operates relay R which releases magnet M at contact $r1$. On the subsequent release of relay R magnet M re-operates and the switch drops in its second stage but no connection is made with a multiple other than the junction multiple already contacted with since no multiple unit is rotated. Relay LO remains operated but no circuit is closed over its contacts lo4, lo5, and lo6. The common control circuit now releases relay M being held over contacts m1 and lt1.

If three impulses are received at the switch neither relay J nor L is operated since the shift rod contact for that level is not connected. Relays JT and LO therefore remain operated and the common control circuit is released. The local selector taken into use a portion of which and a portion of its control circuit are shown on the right hand side of Figs. 15 and 16 may be assumed to be similar to that shown in Fig. 14, but the common control circuit will be provided with relays J and L and a contact of L similar to l1 and a contact of J which connects low resistance battery to the upper speaking wire, and shift rod contacts as in the figure under consideration. When the impulses are received at this selector it will be determined whether the call is a local one or one to be completed over a junction. If the call is local high resistance battery connected over contact of relay L to the upper speaking wire will operate relay H and release relay JT and the junction. If the call is to be completed over the junction relay J will be operated which connects a low resistance battery to the upper speaking wire. Relays H and Y operate and relay LO will release and release the local selector. Contact y2 however closes and holds relay JT and the junction connection remains. Relays Y and H release after the release of the local selector but relay LO cannot re-operate. Relay Y is not operated long enough to allow of operation of relay ZZ and no metering takes place due to this action.

When the calling subscriber clears relay AL releases, opens the circuit over the contacting springs and releases relay V. Contact v1 releases the preceding switch, contact v2 releases magnet M and contact v3 releases relays LO or JT as the case may be and succeeding switches are released. Contact v4 releases relay E but contact e1 does not close until the preceding switch has released.

Release of magnet M releases the restoring rod which closes contact rs. Relay RL and magnet RM operate and the switch is restored.

Figs. 17 and 18 show circuit arrangements for a modification in which an incoming call is received over a multipled outlet which is connected by the switch to another multipled outlet. Such an arrangement may be suitable for a small P. A. X. By providing a switch with 10 rows of 10 outlets each and arranging that 5 rows are used for incoming calls and another 5 rows are used for outgoing calls a switch may connect together any two of 50 lines. Each line is therefore connected in two levels, one level being among the five used for incoming calls and the other level being among the five used for outgoing calls. The type of switch used for the circuit about to be described is that described in connection with the modification shown in Fig. 13 in which the multiple is rotated. The contacting springs for the upper five levels are commoned and so positioned that they engage a rotated multiple when the switch is lowered in its first stage. The contacting springs for the lower five levels are likewise commoned and are so positioned that they engage a rotated multiple only after the switch has been lowered in its second stage. The vertical members 73 (Figs. 1 and 2) are divided into two parts insulated from one another between the fifth and sixth levels, the portion designated 673 having contact fingers corresponding to 71 in Fig. 1 for the test conductors of the upper five levels and being connected to test relays T as in Fig. 14. The test conductors in the multiple for these levels are earthed over contacts of the line relays and contact with them is not made by a switch member. The portion of the vertical members 73 designated 173 in Fig. 18 which have contact fingers corresponding to 71 for the test conductors of the lower five levels are connected to contacts in the banks of a digit switch, the test conductors in the multiple for these levels are connected to the cut off relays of the several lines. A digit switch is provided having wipers DS1—DS4 to receive the two digits required for selecting a wanted line and to select the level in accordance with the first digit and the individual line in the level in accordance with the second digit. An allotter having magnet AM and wiper am is provided which allots a switch to be used in a manner similar to that employed in systems employing call finders. The individual switch circuits are shown in Fig. 17 and the circuits of the common controlling mechanism in Fig. 18.

A switch circuit is connected to a feeding bridge, one side of which includes the impulse relay A connected to the commoned contacting springs of levels 6 to 0, the other side including an answering supervisory relay Y connectible over contacts of a ring tripping relay TR, to the commoned contacting springs of levels 1 to 5. Contacts fd1 and fd2 are closed when the switch is lowered in its first stage and are restored when the switch is lowered in its second stage when contacts sd1—sd4 are operated. Make contacts sd2 of each switch of an assembly are connected in series between the first contact in the allotter bank and battery in order to prevent continued search if all the switches are busy. A free switch is marked in the allotter bank by a battery connection over the winding M of the individual switch magnet, the allotter wiper am being connected over low and high resistance windings of relay Q. When a switch is engaged relay Q is operated and disconnects the allotter magnet AM at contact q1. When the common controlling mechanism becomes free after a switch has been set to a wanted line relay Q releases due to contacts sd1 of the switch concerned becoming operated and magnet AM receives impulses over an interrupter and wiper DS1 of the digit switch in its first position. The allotter steps until a free switch is met whereupon relay Q operates and brings the allotter to rest.

When a subscriber calls his line relay L operates and at contact l1 connects earth over contacts ch4 and q2 to the start relay ST. The contacts l1 of all the lines connected to the switch are commoned and connected to the circuit for the start relay. Contacts l2 of all lines in a level or group of 10 are commoned and connected to contacts closed in turn by the cams on the cam shaft as the cams for the several levers are brought into position for the selection of a level. Contact l3 of each line is connected individually to the corresponding test conductor associated with the test relays by means of the member 673.

On the closure of contact l1 relay ST operates and at contact *st1* closes a circuit over contact *sn3* for slow releasing relay U. Relay U operates, contact *u1* guards magnet DM of the digit switch, contact *u3* connects the cam shaft magnet CM to an interrupter and contact *u4* opens a short circuit over contacts *st2*, and *t2* of the test relays T about the relay CT. The cam shaft is rotated by the interrupter and when the sixth impulse is delivered to the contacts *cm6* are closed, and at each successive step the contacts for subsequent levels are closed in turn. When the cam shaft contacts for the level in which the calling line is connected are closed relay CT operates and locks up over contacts *ct3* and *st3*. Contact *ct2* opens to prevent further rotation of the cam shaft and contact *ct1* closes a circuit over contact *ch1* for relay SN and shift rod magnet SM. The relay and magnet operate, the latter withdrawing a holding detent from the cam shaft ratchet wheel releasing it, and the cam shaft returns to its normal position. Contact *sn3* initiates the release of relay U and closes the testing circuit. The test relay associated with the outlet position in which the calling line is connected operates over bar 673 and contact *l3* and locks up over contact *t1*, which cuts off the test relays for later outlets. Contacts *t2* guards against interference should a line earlier in the testing sequence make a call and prepares a circuit for guide rod magnet GM and relay P which circuit is closed when relay U releases its armature. Magnet GM operates and rotates the selected multiple to bring its contacting portion into line with the switch contacting springs. Relay P operates and at contact *p1* short circuits the high resistance winding of relay Q and magnet M thereupon operates and by releasing the first trip rod lowers the switch in its first stage in which one set of its contacting springs is brought into contact with the calling line connecting relay A to the speaking conductors and earth to the test conductor for the operation of cut-off relay CO. Relay CO operates and disconnects the line relay L which on release releases relay ST unless another line happens to be in a calling condition at the time. Release of relay ST releases relay CT and the test relay. Relay SN and magnets SM are released by the opening of contact *ct1*.

Consequent on the lowering of the switch in its first stage contacts *fd1* and *fd2* are closed. Contact *fd1* operates relay CH and contact *fd2* in conjunction with contact *a1* operates relay AA. Contacts *ch1* and *ch2* connect the shift magnet and cam shaft magnet to circuits controlled by relay AA and contact *ch4* prevents operation of relay ST should another call be made or releases it if another call is waiting, the further calling line being allowed to repeat the starting signal when the controlling mechanism becomes free. Contact *aa1* operates slow releasing release relay V. Contact *aa2* opens preparatory to repeating impulses to the digit switch magnet DM and contact *aa3* opens preparatory to repeating impulses to the cam shaft magnet CM. Relay V operates and at contact *v1* prepares a circuit over contacts *wn4* and *e4* for relay D.

The first train of impulses is now received and are repeated by relay A to relay AA which on the first impulse break operates relay D. Contact *d1* closes the impulsing circuit for magnet DM and the impulses are repeated to magnets DM and CM over contacts *aa2* and *aa3*. Relay D at contact *d4* re-operates relay U. When the cam shaft leaves its normal position contact *cs1* closes. At the end of the impulse train relay D releases and closes a circuit over contacts *bb2*, *sn4*, *e3*, *d3*, *cs1*, *bb1*, *b1* and *ch1* for relay SN and magnet SM and at contact *d4* initiates the release of relay U. Magnet SM operates, releases the cam shaft and operates the shift rod for the selected level. The magnet and relay SN lock up over contacts *sn2* and *v3*. After an interval relay U releases and at contact *u1* closes a homing circuit for the digit switch.

The shift rod of the selected level has brought the multiple operating members of the outlets from the level into operative conjunction with the multiple and maintains them in that position.

The second train of impulses is received and is repeated to magnet DM as before, the circuit of magnet CM being open at contact *sn4*. Relay E operates over contacts *sn1* and *d2*, locks up over contacts *v2* and *e2*, and makes relay D dependent on contact *d5*. At the end of the impulse train relay D releases and at contact *d2* closes a circuit for relay H from earth over contacts *d2*, *e1*, *h1*, *bb5*, *u2*, *b4*, relay H, wiper DS3, bar 173 to the test conductor of the selected outlet which if free is at battery potential over relay CO. The release of the relay U is initiated at contact *d4*. If the line is free relays H and CO operate and the former holds over its contact *h1* independently of relay U. Contact *h2* connects earth over wiper DS4 to operate the guide rod magnet GM and relay P and contact *h4* closes a locking circuit for relay H over its winding (II). Relay CO disconnects line relay L. The guide rod magnet rotates the selected multipled outlet and relay P operates magnet M of the switch to lower it in its second stage. Contacts *sd1—sd4* are operated and contacts *fd1* and *fd2* are opened and the appropriate switch contacting springs are brought into contact with the rotated multiple. The springs previously brought into contact with the calling multiple move further down the turned up contacting part and remain in contact. Contact *sd1* which is of the make-before-break type holds magnet M over contact *a2* and releases relay Q. Contact *sd2* closes in the chain circuit before referred to and contact *sd4* connects ringing current over the right hand winding of relay TR to the called line. When the calling subscriber replies to the ring relay TR operates over the loop and on opening its contact *tr1* holds over its left hand winding and contact *sd3*, contacts *tr2* and *tr3* change over, disconnect the ringing circuit and connect relay Y to the called line. Earth is applied to the test conductor over the relevant contactor spring to hold relay CO and to engage the line.

Consequent on the second stage movement of the switch relays AA and CH are released. Shortly afterwards relays V, E and H release and relay U having released the digit switch is homed. Relays P and SN and magnets GM and SM release. Magnet AM operates and the allotter searches for the next free switch. The controlling mechanism is now available for the next call.

When the calling subscriber clears relay A releases and when the called subscriber clears relay Y releases. When both subscribers have cleared the holding circuit for magnet M is opened and the magnet releases. The restoring rod is released and closes contacts *rs* by turning the restoring shaft in a direction opposite to its restoring movement. The restoring magnet RM operates in series with relay RL, which latter closes at contact rl1 a holding circuit for itself and the magnet which remains closed until the magnet armature is fully attracted whereupon contacts rm are opened and the magnet and relay are released. Operation of the magnet brings about the restoration of the switch as previously described. Restoration of a switch can take place when the common mechanism is in use as there are no movable parts running transversely to the switches of an assembly and the circuit of the restoring magnet is independent of the remainder of the circuit. The restoration of the switch shown in Fig. 15 of which the multiple is similarly constructed can of course take place in like manner.

If the called line is found engaged relay H will be short circuited by the engaging earth on the test conductor and will not operate. On the release of relay U relay B operates over contacts u2, bb5 and the circuit previously traced for relay H and releases relay SN and magnet SM at contact b1. Relay U re-operates over contacts sn3 and b5 and at contact u4 operates relay BB which locks up over contacts bb3 and v4. A circuit is now closed for magnet GM over contacts b2 and bb2 and the magnet receives one impulse bringing the cam appropriate to level 1 into operative conjunction with the pawl of the shift rod magnet shaft for level 1, the shift rod of the previously selected level having been released. Relay B releases consequent on the opening of contact bb5 and at contact b1 re-closes the operating circuit for the shift rod magnet and relay SN. Contact b2 de-energizes magnet CM and the cam shaft is released by the action of magnet SM and contact b5 opens the circuit for relay U. When relay U releases contact u4 closes a circuit over contact bb4 for the guide rod magnet associated with the first outlet choice and the multiple is rotated. Relay P operates to cause the switch to contact with the selected outlet over which a busy signal may be transmitted to the calling subscriber. Relay TR is operated when the contacting springs engage the multiple. The control mechanism is released as before, relay BB being released at contact v4 and releasing magnet GM and relay P.

Should a subscriber dial more than 5 impulses for the first digit the digit switch is stepped to one of the contacts 6 to 10. The corresponding contacts in the bank of wiper DS2 are connected over contact u5 to relay WN which is accordingly operated. Relay WN locks over contacts wn2 and v5.

On the release of relay U at the end of the train relay B operates over contact wn1 and prepares the circuit of relay BB as before. Contact wn4 prevents re-operation of relay D so that a second digit is without effect. Relays B and BB operate as for a busy line to bring about the connection of the calling line to a busy signal circuit.

When connection is made by the switch to calling line and relay CH is operated preparatory circuits are closed for a pair of time delay relays S and Z which if a connection is not completed within a given time operate as previously described. Contact z2 operates relay WN with the results described above.

If the calling subscriber clears before the calling level is reached by the cam shaft relay ST releases and releases relay U, which releases magnet CM and the cam shaft remains off-normal since magnet SM has not been operated. If the next call to be made is in a higher level it is searched for and found in the normal manner but should it be in a lower level the cam shaft is rotated until the 10th level is reached. The cam shaft contact cm10 of this level is permanently earthed so that relay CT is operated to release magnet CM and operate magnet SM. If there is no line calling in this level no test relay is operated and on the release of relay U at contact sn3 relay CT is released by short circuiting. Relay SN releases, re-operates relay U and magnet CM is again energized and rotates the cam shaft in search of the level in which the line is calling.

If the calling subscriber clears after the level has been found but before relay U releases the test relay operated will release and on the release of relay U relay CT will be short circuited and released. Magnet SM and relay SN will be released but since relay ST has released relay U will not re-operate and the mechanism will remain in its normal condition since the cam shaft was released by the operation of magnet SM.

I claim:—

1. In a selective switch mechanism a plurality of inlets and a plurality of outlets, a plurality of sets of contact members for each inlet, a set of conductors for each outlet associated with contact members of a plurality of inlets, means for first selecting the conductors of an outlet, mechanical means common to said outlets, operating means individual to the conductors of each inlet, said common means operated to control a set of members associated with a particular inlet to establish a connection between the members and the conductors of the previously selected outlet.

2. In a selective switch mechanism, a plurality of sets of inlet contacts, a plurality of sets of outlet conductors, means for selecting a set of outlet conductors, means for preparing the contact sets of an inlet for connection to an outlet by moving said inlet sets, means individual to the selected outlet set and operated to further move one of the sets of inlet contacts relative the conductors, and means for moving the inlet set to connect with the selected conductors.

3. In a selective switch mechanism, a plurality of sets of inlet contacts arranged in vertical parallel planes, sets of conductors in parallel planes at right angles thereto, a common controlling mechanism comprising selecting members arranged in a plane parallel to the inlet contact sets, operating members one for each conductor set, said control mechanism first moving all the contact sets of an inlet, then moving all contact sets associated with a particular set of conductors and then again moving all contact sets of the inlet to connect one contact set of an inlet with a particular set of conductors.

4. In a selective switch mechanism, a contact carrying member, a plurality of sets of conductors, means individual to each set of conductors operated to select a conductor for engagement by a relative movement between the conductor and the contact sets, and means for moving the member always in the same manner to connect a contact with a conductor dependent on the previous relative movement.

5. In a cross bar switch for use in automatic telephony, a series of conductor multiples rigidly mounted, a series of switches associated with the multiples, each switch having a contact set for each multiple, means associated with each multiple for mechanically marking that multiple for selection, and means for always bodily moving a switch and all its contacts in a two stage movement to connect a contact set with the marked multiple to extend a connection thereto.

6. In a cross bar switch for use in automatic telephony, a series of conductor multiples, a series of switches associated with the multiples, each switch having a contact set for each multiple, a common control mechanism for all the switches mounted adjacent the switches, means responsive to the seizure of a switch to move said switch into selecting position, means in the common mechanism for marking a multiple for selection only in the moved switch, and means for then moving the switch in a further movement to connect with the marked multiple.

7. In a cross bar line switch having a network of conductor multiples and a series of switches each having a contact set for connection to each of the multiples, a common control mechanism, said mechanism having means for marking any multiple for connection by a contact set, for releasing the marking means after the contact is connected to the multiple and marking another multiple, and for releasing contact sets from connection with a multiple.

8. In a selective switch mechanism, a plurality of inlets and a plurality of outlets, a series of switches terminating the inlets and a series of multiple conductors terminating the outlets, a series of test relays connected each to the test conductors of a group of outlets, means for determining that the outlets are taken into use in a definite sequence, and means for preventing interference with the connection to a selected outlet by the release of a connection to a previously selected outlet.

9. In a selective switch mechanism, a plurality of inlets and a plurality of outlets, a test conductor for each outlet, testing arrangements for testing outlets, said testing arrangements including a differential relay connected through a rectifier to the test conductor of an outlet, said relay operated only when a certain potential indicating a free outlet is connected to the test conductor thereof.

10. In a switching mechanism, a plurality of sets of contacts terminating an inlet, a plurality of outlets for connection with the inlet having a series of contacts one for each set of inlet contacts, an operating bar for each outlet, means for moving the inlet contacts into selecting position, means for then operating the bar of one outlet to bring only one set of inlet contacts into connecting position, and means for then moving the inlet contacts to connect the one set of inlet contacts with the contacts of said one outlet.

11. In a selective switch mechanism, inlet members and outlet contacts there being one inlet member of each inlet for each outlet, and one set of contacts of each outlet for each inlet member, a common operating mechanism, an operating member for each outlet common to all inlet members associated with that outlet, said common mechanism operated to bring all members of an inlet into selecting position and for selecting an operating member of an outlet and operating it to bring the members of the inlet in selecting position into contact with the contacts of the selected outlet always by the same movement of the operating member.

DAVID A. CHRISTIAN.